(12) United States Patent
Abe et al.

(10) Patent No.: US 7,703,314 B2
(45) Date of Patent: Apr. 27, 2010

(54) PROBE POSITION CONTROL SYSTEM AND METHOD

(75) Inventors: Masayuki Abe, Osaka (JP); Masahiro Ota, Kyoto (JP); Yoshiaki Sugimoto, Osaka (JP); Kenichi Morita, Osaka (JP); Noriaki Oyabu, Osaka (JP); Seizo Morita, Osaka (JP); Oscar Custance, Osaka (JP)

(73) Assignees: Shimadzu Corporation, Kyoto (JP); Osaka University, Suita-shi (JP)

( * ) Notice: Subject to any disclaimer, the term of this patent is extended or adjusted under 35 U.S.C. 154(b) by 552 days.

(21) Appl. No.: 11/802,624

(22) Filed: May 24, 2007

(65) Prior Publication Data

US 2007/0272005 A1 Nov. 29, 2007

(30) Foreign Application Priority Data

May 25, 2006 (JP) .............................. 2006-145881

(51) Int. Cl.
*G01B 5/28* (2006.01)
(52) U.S. Cl. ...................................................... 73/105
(58) Field of Classification Search ........................ None
See application file for complete search history.

(56) References Cited

U.S. PATENT DOCUMENTS 6,169,281 B1 * 1/2001 Chen et al. .................. 250/234

FOREIGN PATENT DOCUMENTS

JP 2006-289542 A 10/2006

OTHER PUBLICATIONS

D. W. Pohl et al.; "Tracking" tunneling microscopy.; Review of Scientific Instruments, vol. 59(Dec. 1988), pp. 840-842.

(Continued)

*Primary Examiner*—Robert R Raevis
(74) *Attorney, Agent, or Firm*—Westerman, Hattori, Daniels & Adrian, LLP

(57) ABSTRACT

The present invention provides a technique for eliminating the effect of the thermal drift and other variances and to improve the observing or manipulating accuracy of a scanning probe microscope or atom manipulator by using the technique to correct the aforementioned change in the relative position of the probe and the sample due to heat or other factors during the observation or manipulation. To obtain an image of the sample surface at the atomic level or perform a certain manipulation on an atom on the sample surface, the present invention can be applied to a probe position control method for controlling the relative position of the probe and the sample while measuring an interaction between the objective atom on the sample surface and the tip of the probe. In the present method, the relative position of the probe and the sample are changed while the probe is oscillated relative to the sample in two directions parallel to the sample surface at frequencies of $f_1$ and $f_2$ (S1$a$). Meanwhile, a point (or characteristic point) where the frequencies $f_1$ and $f_2$ disappear from the measured value of the interaction working in the direction perpendicular to the sample surface is detected (S1$b$). Then, the relative movement of the probe and the sample is controlled so that the measurement value thereby detected is maintained (i.e. the characteristic point is tracked; S1$c$), and the speed of the aforementioned relative movement is determined (S1$d$). Subsequently, the relative position control is corrected using the detected speed (S2).

20 Claims, 30 Drawing Sheets

OTHER PUBLICATIONS

M. Abe et al.; "Room-temperature reproducible spatial force spectroscopy using atom-tracking technique"; Applied Physics Letters, vol. 87(Oct. 2005), pp. 173503-1-3.

M. Abe et al.; "Atom tracking for reproducible force spectroscopy at room temperature with non-contact atomic force microscopic"; Nanotechnology, vol. 16(Oct. 2005), pp. 3029-3034.

Seizo Morita ed; "Sousa Gata Puroobu Kenbikyou; Kiso To Mirai Yosuku (Scanning Probe Microscope; Fundamentals and Future Prediction)"; Maruzen, Tokyo (2000) pp. 15-23.

D. Rugar et al.; "Improved fiber-optic interferometer for atomic force microscopy"; Applied Physics Letters, vol. 55(Oct. 1989), pp. 2588-2590.

P. Günther et al,: "Scanning Near-Field Acoustic Microscopy"; Applied Physics B, vol. 48, pp. 89-92(Oct. 1989).

F. J. Giessibl; "High-speed force sensor for force microscopy and profilometry utilizing a quartz tuning fork"; Applied Physics Letters, vol. 73 pp. 89-90 3956-3958, Oct. 1998.

J. Rychen et al.; "A low-temperature dynamic mode scanning force microscope operating in high magnetic fields"; Review of Scientific Instruments, vol. 70(Feb. 1999), pp. 2765-2468.

F.J. Giessibl; "Atomic Resolution of the Silicon (111)-(7x7) Surface by Atomic Force Microscopy", Science, vol. 267(1995), pp. 68-71.

\* cited by examiner

Fig. 2
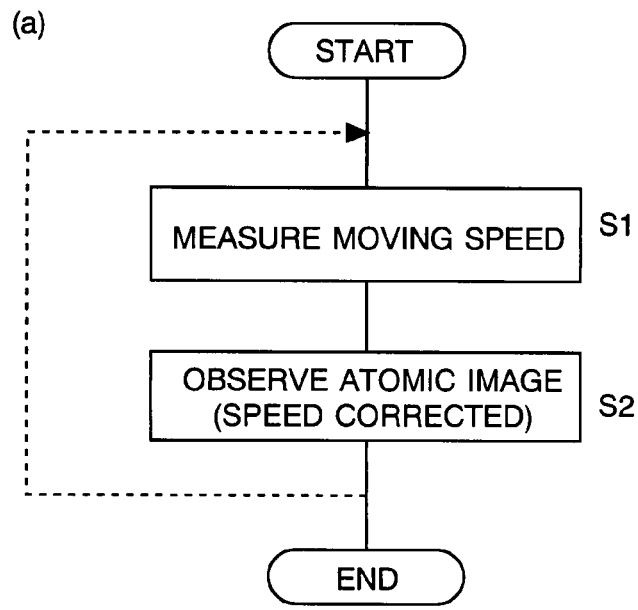
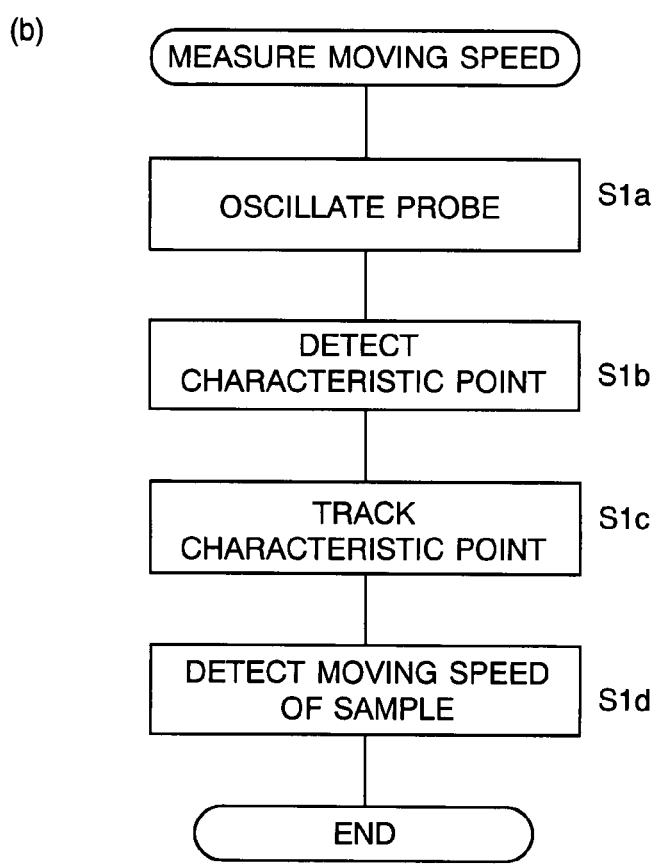

Fig. 3
(a)
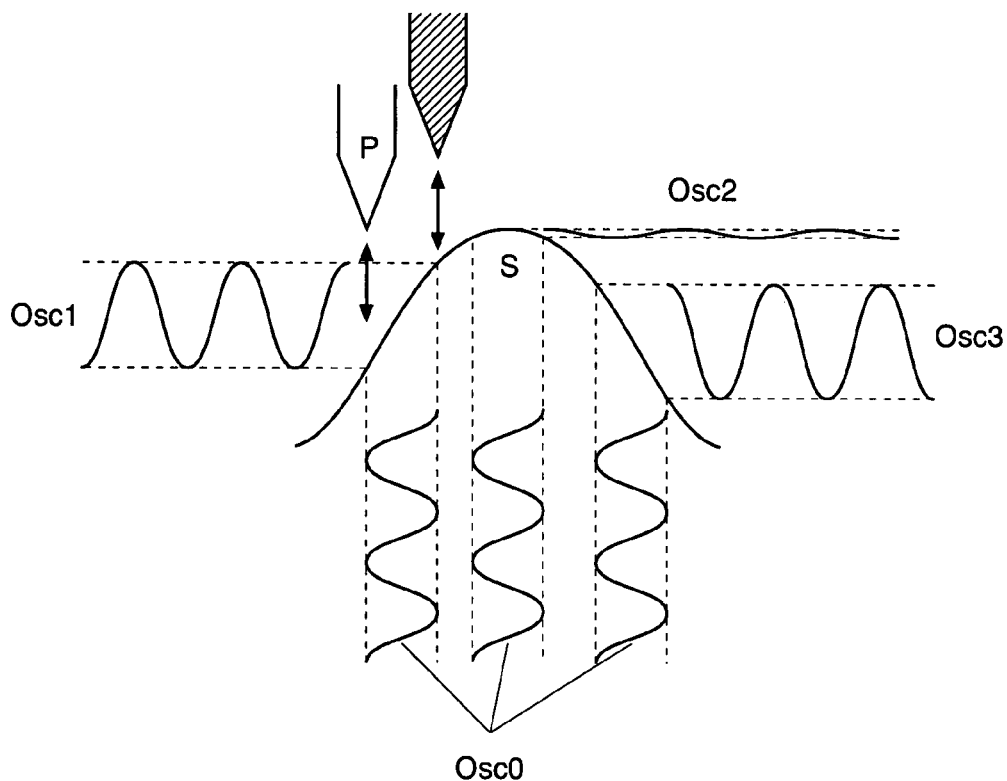
(b)
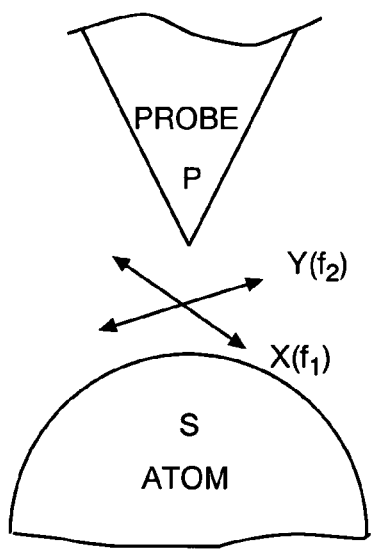
(c)
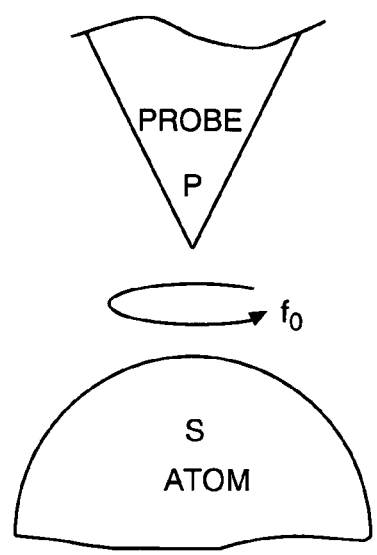

Fig. 4
(a)
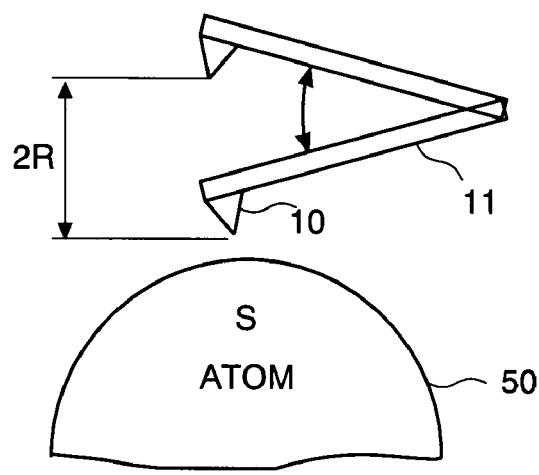
(b)
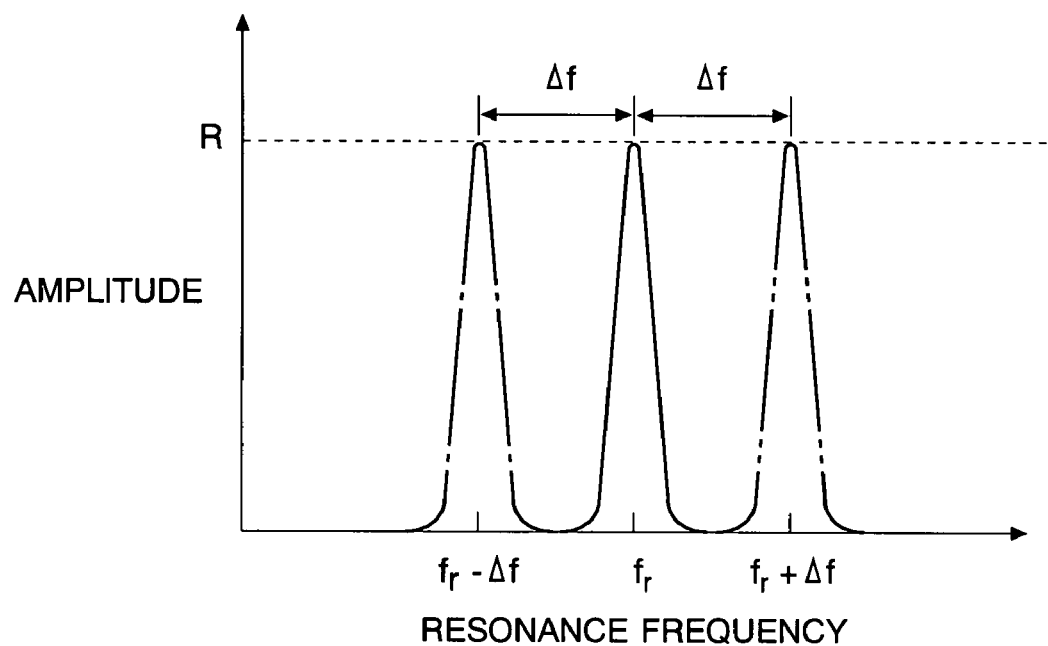

Fig. 9
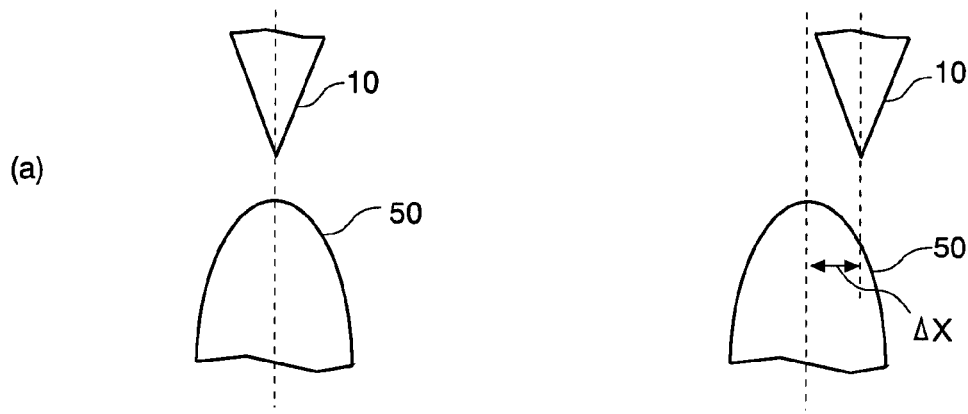
(a)
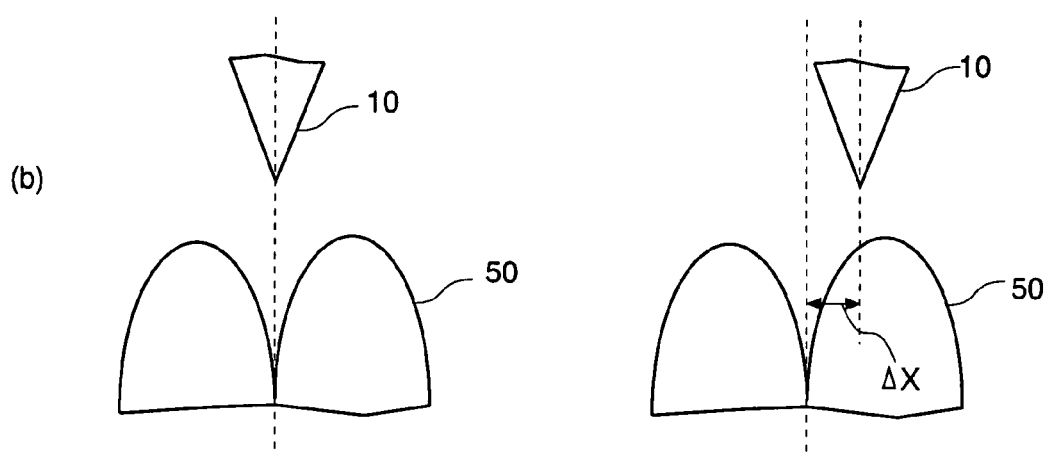
(b)

Fig. 10
(a)
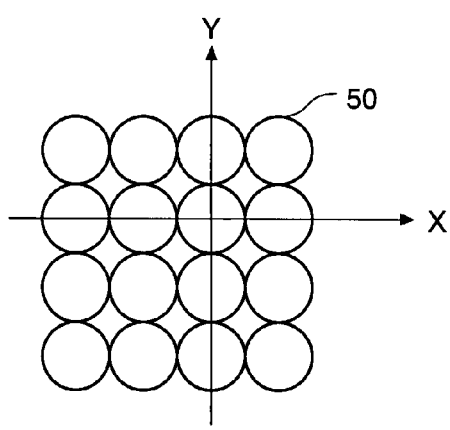
(c)
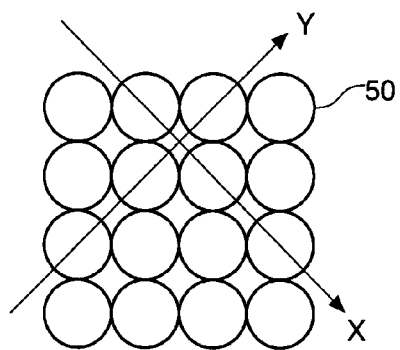
(b)
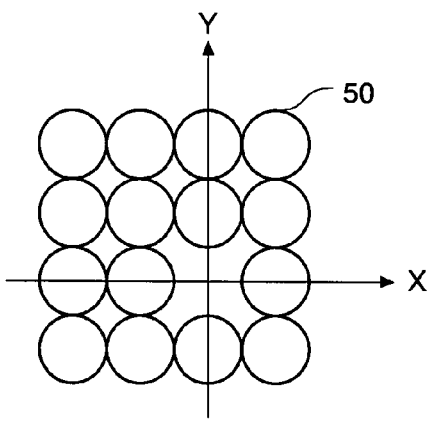
(d)
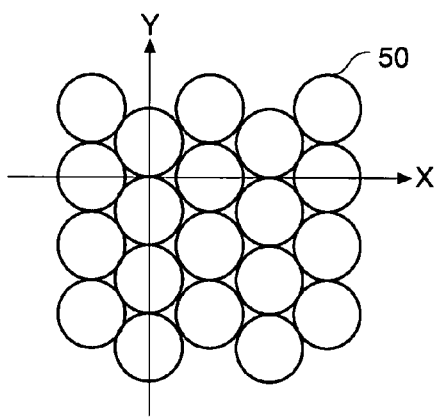

Fig. 12
(a) 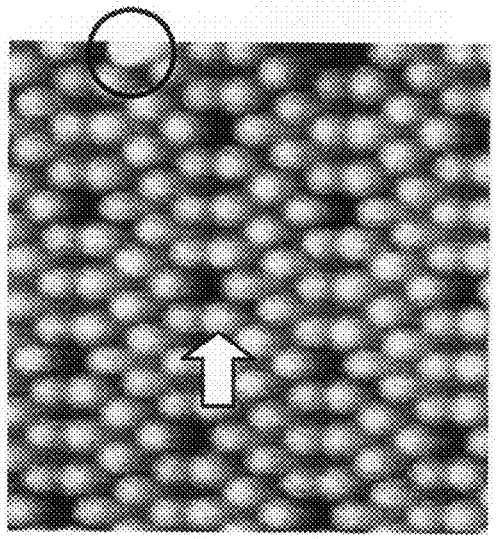
(c) 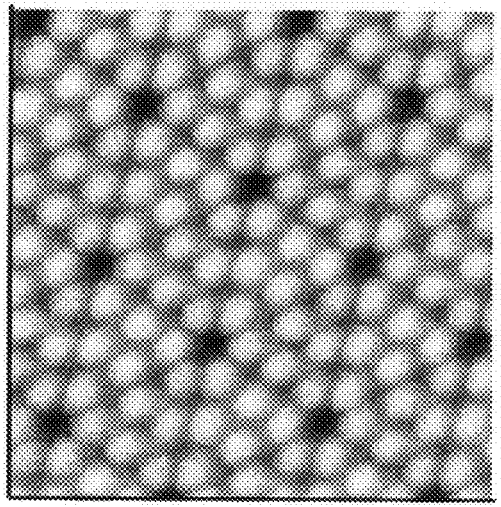
AFTER TRACKING FOR 61 MINUTES
 FREIGN MATTER
 TRACKED POSITION
(b) 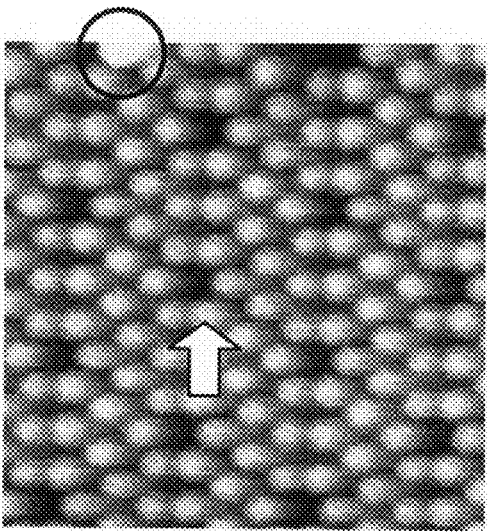
(d) 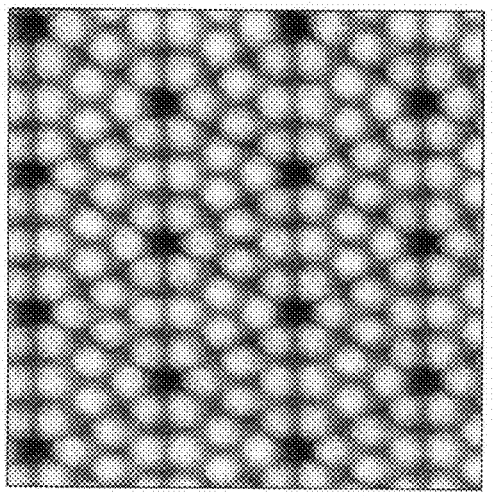

Fig. 13
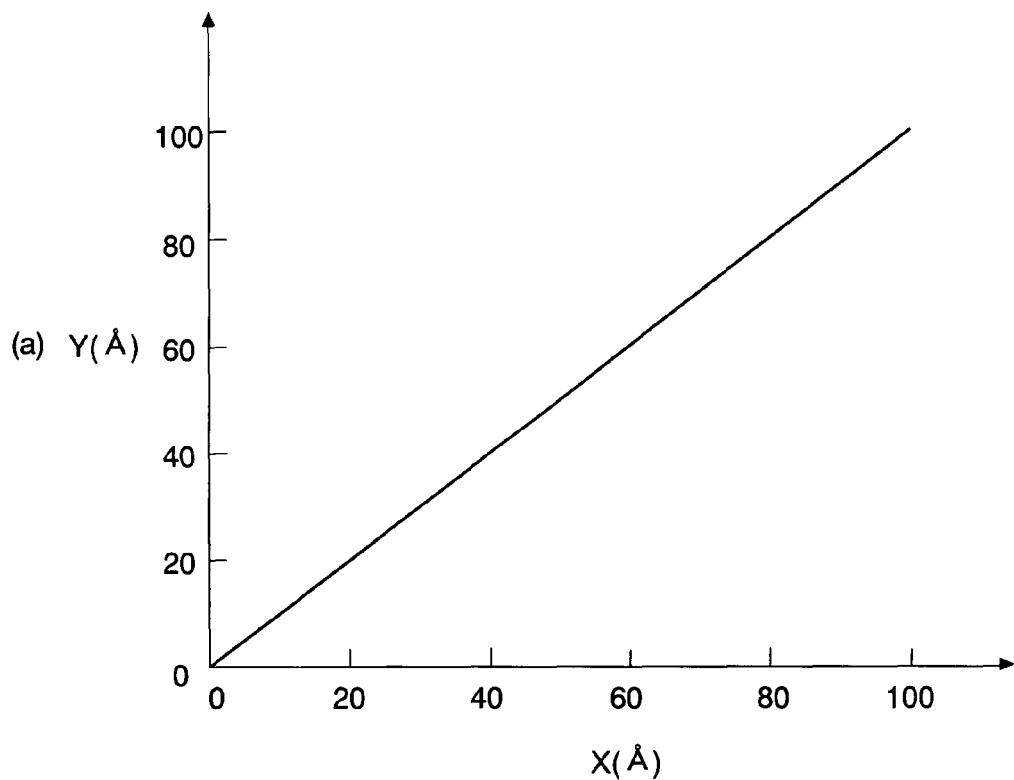
(a)
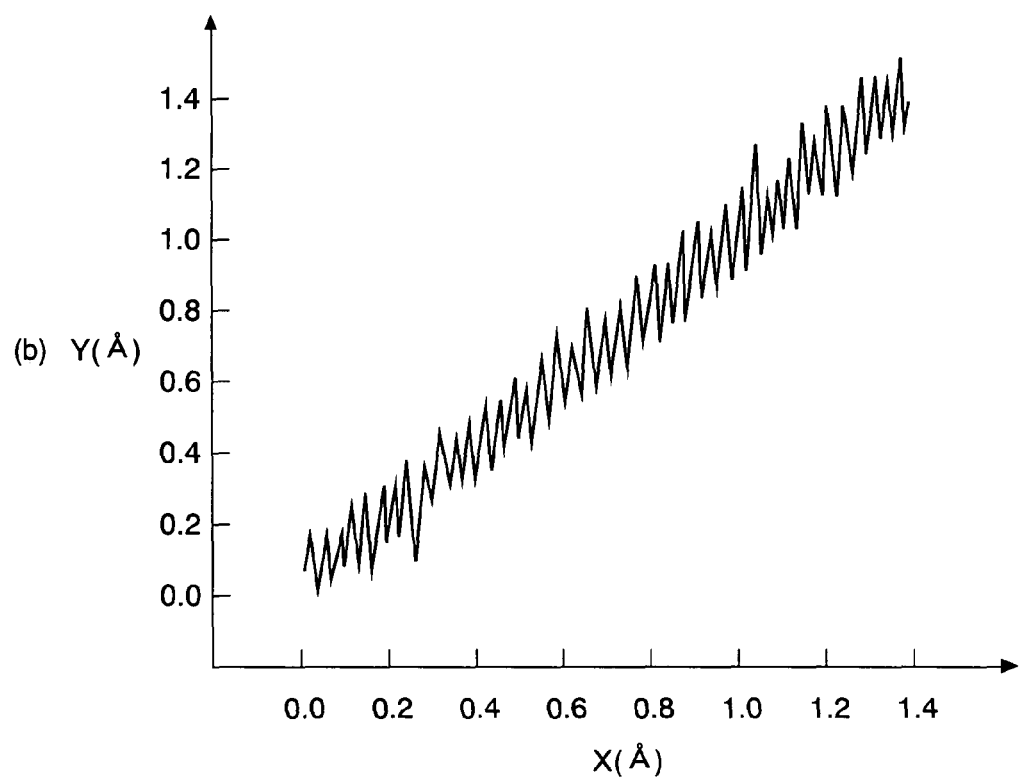
(b)

Fig. 14
(a) 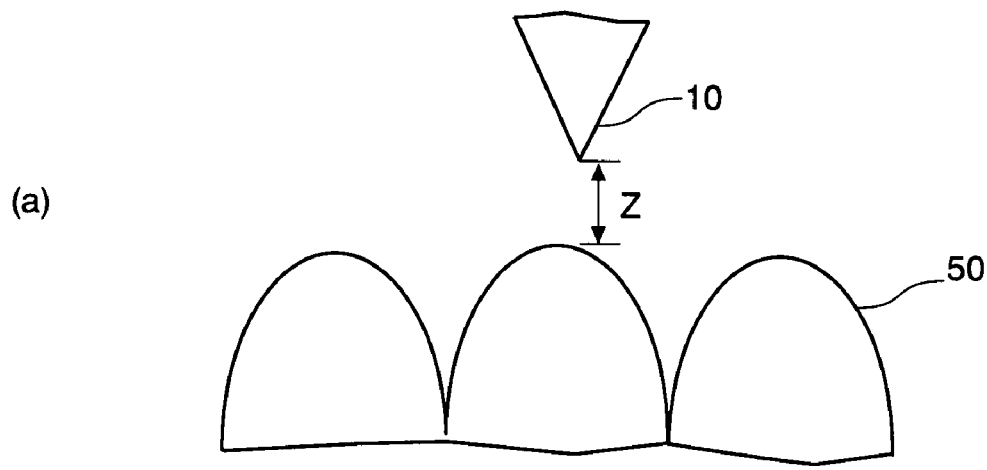
(b) 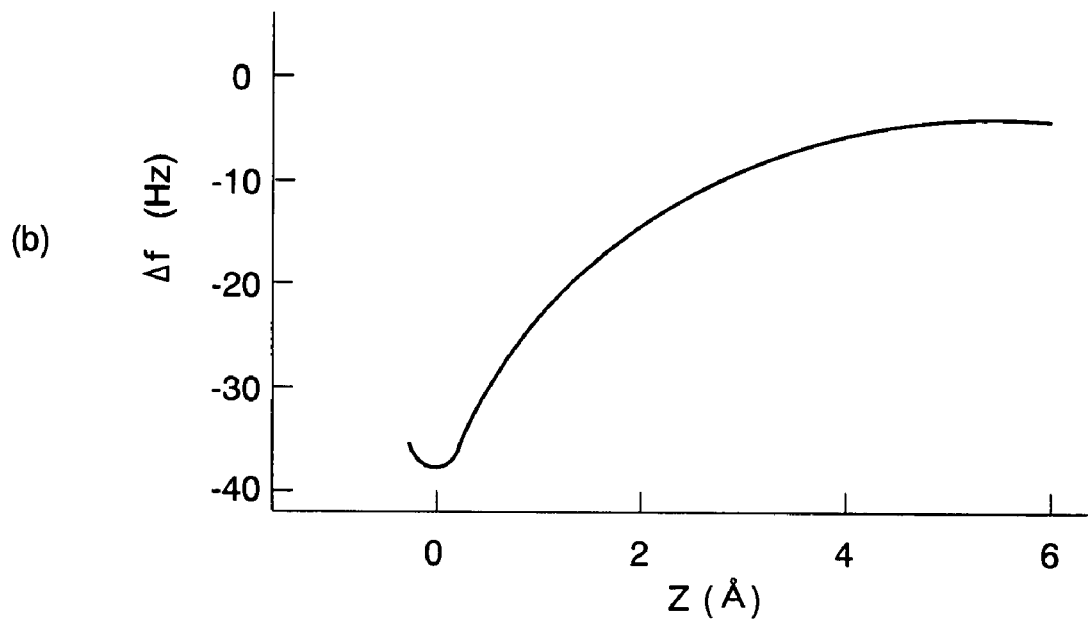

Fig. 23
(a) 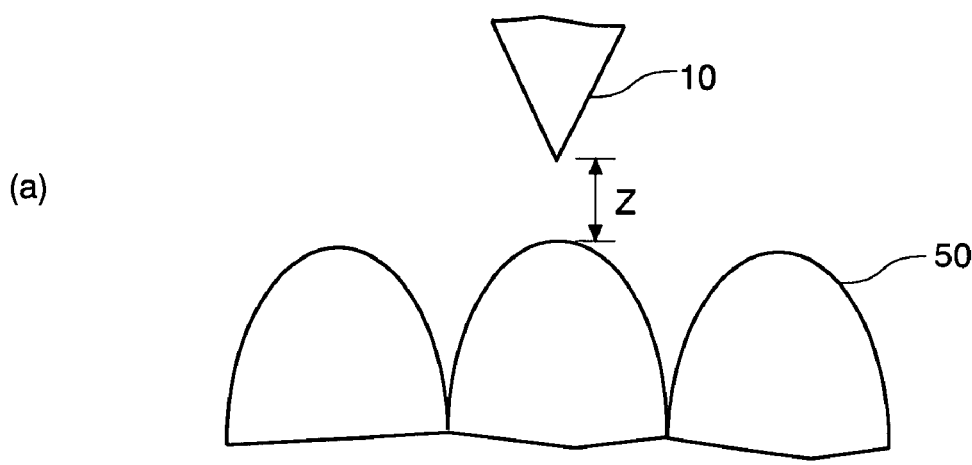
(b) 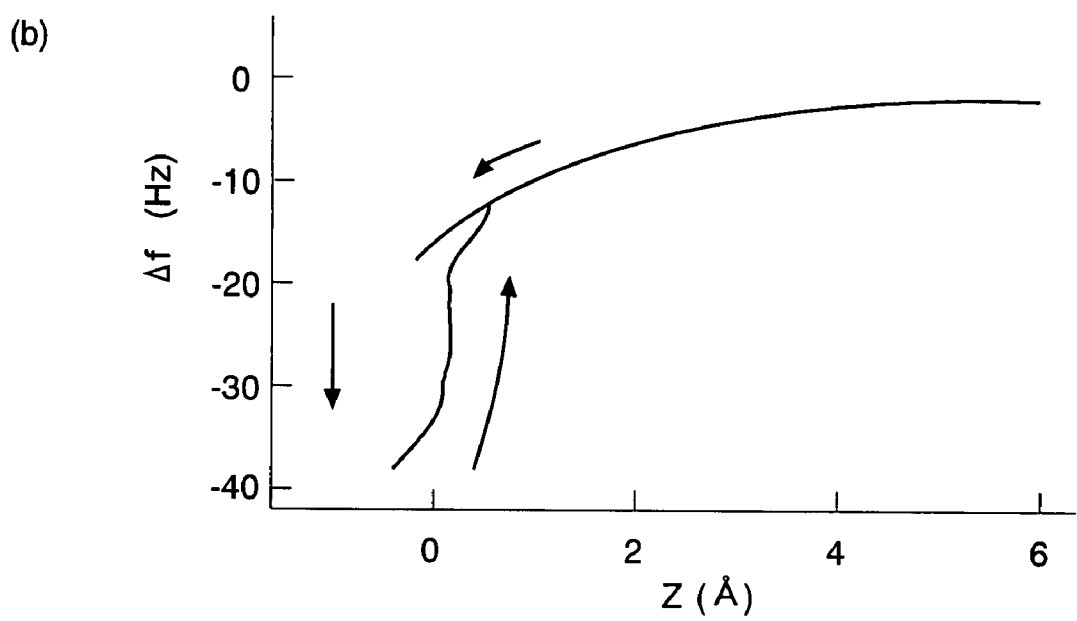

PROBE POSITION CONTROL SYSTEM AND METHOD

The present invention relates to a method and system for controlling the position of a probe in a scanning probe microscope (SPM) or atom manipulator. Particularly, the present invention relates to a method and system for improving the accuracy of observation or manipulation of a sample by correcting the change in the relative position of the probe and the sample due to heat, temperature or other factors during the observation or manipulation.

BACKGROUND OF THE INVENTION

In scanning probe microscopes, or SPMs, a cantilever having a probe located at as small a distance from the sample surface as the atomic level is oscillated at its mechanical resonance frequency, and the interaction between the probe and the sample surface is detected. An atomic-level image of the sample surface can be obtained by detecting the aforementioned interaction while changing the relative position of the sample and the probe. Atom manipulators also use a probe positioned close to the sample surface. After the probe is positioned at a certain distance from the sample, a predetermined manipulation is performed on an atom on the sample surface.

Known examples of the interaction to be detected between the sample and the probe in the SPM or similar apparatus include the tunneling current, interaction forces between atoms (which is hereinafter referred to as "interatomic forces") (chemical bond force, van der Waals force, covalent bond force, ionic bond force, metallic bond force, electrostatic force, magnetic force, exchange force, etc.), capacitors and the near-field light. In general, obtaining one image by detecting one of these interactions takes anywhere from a few minutes to ten minutes or longer.

If heat is exchanged between the measuring apparatus and the surroundings in the middle of recording the sample image, the sample expands or shrinks (i.e. thermal drift). At room temperature, even in a space where the temperature is controlled, it is impossible to completely maintain the overall temperature of the measuring apparatus at the same level, so that the thermal drift is inevitable. Another problem exists in that the relative position of the sample and the probe can change due to a creep of the piezoelectric element used for changing the relative position between them. Since the measurement is performed at the atomic level, the change in the measurement position caused by a thermal drift or creep significantly affects the measurement result. For example, an image that is supposed to be as shown in FIG. 12($d$) can be resultantly distorted as shown in FIG. 12($c$). Such effects of the thermal drift or similar variance can not only take place in a direction parallel to the sample surface (XY plane) but also in the direction perpendicular to that surface (Z-direction).

If the sample to be measured is a solid whose surface has a highly symmetrical, well-known structure, any distortion of the image can be immediately recognized by sight, so that there is no serious problem. However, in the case of measuring a biological sample or similar matter whose surface geometry is rather asymmetrical, if an effect of a thermal drift, migration or other variance is present on the image, it is impossible to recognize and/or separate that effect. Therefore, it is practically infeasible to correctly measure the surface geometry. For the atom manipulator, a distortion of the image causes a shift of the target atom within the image, which impedes the correct manipulation of the atom.

A technique for compensating for the effect of a thermal drift or other variances to accurately position the probe and the sample is disclosed in Non-Patent Document 1. This technique, called the atom-tracking technique, corrects the thermal drift in a direction parallel to the sample by a feedback process. Recent studies have demonstrated that the interaction or potential between the probe and the atoms on the sample surface can be measured by performing ultra-precise three-dimensional positioning of the probe in relation to the sample while monitoring the change in the frequency of the probe by the atom-tracking technique (Non-Patent Documents 2 and 3).

[Patent Document 1] Japanese Unexamined Patent Application Publication No. 2006-289542

[Non-Patent Document 1] D. W. Pohl and R. Moeller, "Tracking tunneling microscopy", *Review of Scientific Instruments*, vol. 59(1988), p. 840

[Non-Patent Document 2] M. Abe et al., "Room-temperature reproducible spatial force spectroscopy using atom-tracking technique", *Applied Physics Letters*, vol. 87(2005), p. 173503

[Non-Patent Document 3] M. Abe, Y. Sugimoto, O. Custance and S. Morita, "Atom tracking for reproducible force spectroscopy at room temperature with non-contact atomic force microscopy", *Nanotechnology*, vol. 16(2005), p. 3029

Thus, an objective of the present invention is to provide a technique for eliminating the effect of the thermal drift or other variances and to improve the observing or manipulating accuracy of a scanning probe microscope or atom manipulator by using the technique to correct the aforementioned change in the relative position of the probe and the sample due to heat or other factors during the observation or manipulation.

SUMMARY OF THE INVENTION

To solve the previously described problem, the present invention provides a probe position control system for performing a control of the relative position of a probe and a sample while measuring an interaction between an atom on the sample surface and the tip of the probe to obtain an atomic-level image of the sample surface or perform a certain manipulation on the atom on the sample surface, which includes:

a) a measuring device for measuring the aforementioned interaction in the direction perpendicular to the sample surface;

b) an oscillator for relatively oscillating the probe and the sample in two directions parallel to the ample surface at frequencies of $f_1$ and $f_2$, respectively;

c) a tracker for measuring the aforementioned interaction, before the control of the relative position of the probe and the sample, while relatively moving the probe and the sample, for detecting a point where the frequencies $f_1$ and $f_2$ disappear from the measured value of the interaction, and for creating a relative movement of the probe and the sample so that the measurement value thereby detected is maintained; and d) a speed detector for determining the speed of the aforementioned relative movement created by the tracker; and e) a corrector for correcting the control of the relative position of the probe and the sample using the detected speed.

The frequencies $f_1$ and $f_2$ in the two directions may be different from or equal to each other. Under the conditions that the two directions are mutually perpendicular, if the frequencies $f_1$ and $f_2$ are equal and have a phase difference of 90 degrees, the probe will make a circular motion with respect to the sample.

The speed detector detects only the speed in a direction parallel to the sample surface. Additionally, it may also detect a speed component perpendicular to the sample surface. This speed component can be detected by a normally performed feedback control in the Z-direction.

In the probe position control system according to the present invention, the tracker relatively moves the probe and the sample in a direction parallel to the sample surface while the oscillator is relatively oscillating the probe and the sample in two directions parallel to the sample surface at frequencies $f_1$ and $f_2$, respectively. Meanwhile, the measuring device measures the interaction between the probe and the sample, and the tracker detects a point where the frequencies $f_1$ and $f_2$ disappear from the measured value of the interaction. For example, this point corresponds to the top of an atom on the sample surface or a bottom or saddle point of the atomic arrangement. Such a point is referred to hereinafter as the characteristic point of the sample. After a characteristic point is detected, the tracker controls the movement of the probe and the sample to track that point. The speed detector derives the speed of the relative movement of the probe and the sample from the tracking movement of the tracker. This relative movement results from a certain variance, such as the thermal drift or creep of the sample, and the determined speed represents the speed of that variance. The corrector uses the determined speed to modify the control of the relative position of the probe and the sample. While probing for an image of atoms on the sample, if the objective portion of the sample has moved due to a thermal drift or similar variance, the present system can correct that movement and keep track of the objective portion so that a correct image of the atoms can be obtained. This atom-tracking technique is also applicable to the manipulation of an objective atom on the sample.

BRIEF DESCRIPTION OF THE DRAWINGS

FIGS. 2(a) and 2(b) are flowcharts showing general steps to obtain a correct image of atoms with the SPM of the embodiment.

FIGS. 3(a)-3(c) illustrate a method of detecting a characteristic point of the sample, where the probe oscillates in the Z-direction as it is oscillated within the XY plane.

FIGS. 4(a) and 4(b) illustrate the relationship between the resonance frequency and the oscillation amplitude of a non-contact atomic force microscopy using a frequency detection technique.

FIGS. 9(a) and 9(b) illustrate the function of the position fine-adjuster.

FIGS. 10(a)-10(d) show examples of fixation points.

FIGS. 12(a) and 12(b) show images of the surface of Si(111)7×7 before and after the position fixation control, FIG. 12(c) show an image of the sample obtained when the speed control correction was not performed, and FIG. 12(d) is an image obtained when the speed control correction was performed.

FIGS. 13(a) and 13(b) show an example of the position control correction on the surface of Si(111)7×7.

FIGS. 14(a) and 14(b) are conceptual diagrams of a mechanical spectroscopic measurement (distance-dependent measurement).

FIGS. 23(a) and 23(b) are conceptual diagrams of the atom manipulation method.

EXPLANATION OF NUMERALS

1 . . . Atom Position-Fixing System
10 . . . Probe
11 . . . Cantilever

12 ... Oscillator
13 ... Displacement Detector
14 ... Oscillation Controller
15 ... Frequency Detector
16 ... Vertical Position Controller
17, 17' ... Horizontal Position Controller
18 ... Inclination Corrector
19 ... Vertical Position Scanner
20 ... Horizontal Position Scanner
21 ... Sample Retainer
31 ... Oscillation Circuit
31a ... First Oscillation Circuit
31b ... Second Oscillation Circuit
32 ... Synchronous Detector
32a ... First Synchronous Detector
32b ... Second Synchronous Detector
33a ... First Horizontal Position Adjuster
33b ... Second Horizontal Position Adjuster
34a ... First Adder
34b ... Second Adder
50, 50a, 50b ... Atoms

DETAILED DESCRIPTION OF PREFERRED EMBODIMENTS

Figure 1:
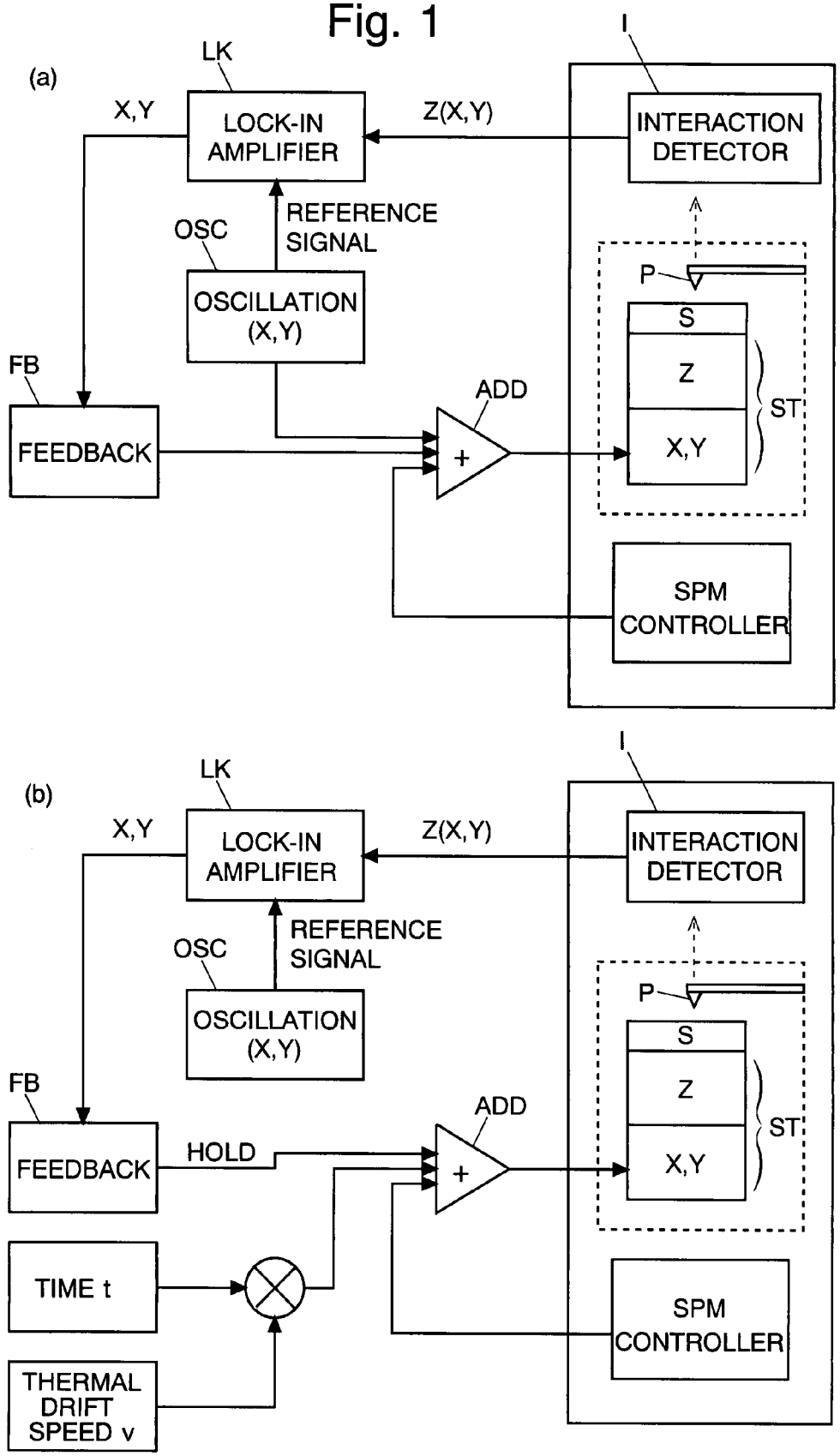
FIGS. 1(a) and 1(b) are block diagrams schematically showing the construction of a scanning probe microscope (SPM) according to an embodiment of the present invention.

A scanning probe microscope (SPM) as an embodiment of the present invention is described with reference to FIGS. 1(a)-3(c). FIGS. 1(a) and 1(b) are block diagrams schematically showing the construction of the SPM according to the present embodiment. FIGS. 2(a) and 2(b) are flowcharts showing general steps to obtain a correct image of the atoms. As shown in FIGS. 1(a) and 1(b), the SPM according to the present embodiment includes a sample stage ST on which a sample S is to be set and a sample-moving mechanism for moving the sample S in three directions (X, Y and Z). A probe P is positioned above the sample surface. The probe P is held at a small distance from the sample surface so that an interatomic force can work between the tip of the probe P and the sample surface. An interaction that takes place at the tip of the probe P is measured by the interaction detector I.

In FIGS. 1(a) and 1(b), all the components of the sample-moving mechanism are located on the side of the sample S. This construction can be modified as long as the mechanism can change the relative position of the probe P and the sample S. For example, a portion or entirety of the X, Y and Z components may be provided on the side of the probe P. It should be noted that in the following description such phrases as "the sample S/probe P oscillates/moves (or is oscillated/moved)" all refer to a change in the relative position of the probe and the sample.

When the sample is moved within the XY plane, the distance between the probe P and the surface of the sample S changes according to the change in height of the sample surface. This causes a change in the interaction between the probe P and the sample S. The interaction detector I discerns this change and moves the sample stage ST in the Z direction so that the interaction acting on the probe P is maintained at the same level. By scanning the sample surface with the probe P in this manner, a two-dimensional image of the atoms on the sample surface is obtained.

The foregoing description explains a normal operation of conventional SPMs. The observation of atoms with the SPM according to the present embodiment includes additional steps as shown in FIG. 2(a): First, the moving speed of the objective portion of the sample S is determined under the environmental conditions at the moment (Step S1). This step will be detailed later. After the moving speed v of the objective portion of the sample S is determined, the image of the atoms on the sample surface is observed while the movement of the sample S is controlled using the speed v (Step S2). Thus, a correct image of the atoms free from deformation due to a thermal drift or similar variance is obtained.

The basic principle of the speed detection in Step S1 is described with reference to FIGS. 2(b) and 3(a). The probe P is oscillated within a plane (XY plane) parallel to the sample surface at a frequency of $f_1$ (Step S1a in FIG. 2(b); Osc0 in FIG. 3(a)). If the probe P is on the left-side slope of the sample S shown FIG. 3(a), the probe P scanning the surface of the sample S will oscillate in the Z-direction in phase with the oscillating force at the same frequency, $f_1$ (Osc1). If the probe P is close to the peak of the sample S, the amplitude of the Z-direction oscillation will be approximately zero (Osc2). If the probe P is on the right-side slope of the sample S in FIG. 3(a), the probe P will oscillate in the Z-direction in antiphase with the oscillating force (Osc3).

FIG. 3(a) shows only one direction parallel to the sample surface. Actually, the oscillating operation is performed in two different directions parallel to the sample surface, whereby the peak point on the sample surface can be detected (Step S1b in FIG. 2(b)). In addition to the peak point, a bottom point or saddle point also gives the minimum amplitude of the Z-direction oscillation. After such a characteristic point is detected, the point is tracked for a predetermined period of time (Step S1c) to determine the moving speed of the point. This speed is regarded as the moving speed of the sample at that point (Step S1d).

The frequency at which the probe P is oscillated should be lower than the bandwidth of the electronic circuits constituting the interaction detector I so that it does not interfere with the circuits.

The oscillating frequencies of the probe P in the two different directions parallel to the sample surface may differ from each other as shown in FIG. 3(b) ($f_1 \neq f_2$) or equal to each other ($f_1 = f_2$). If the two frequencies are equal ($f_0$) and have a phase difference of 90 degrees, the probe P will make a circular (or elliptical) motion, as shown in FIG. 3(c). This method simplifies the mechanisms for producing the oscillation and detecting the Z-direction oscillation.

In the speed detection, the mechanism shown in FIG. 1(a) operates as follows: While the SPM controller is controlling the three-dimensional (XYZ) movement of the sample S, the oscillator OSC supplies the adder ADD with frequency signals ($f_1$, $f_2$) for the two directions (X, Y), whereby the sample S is oscillated. In this state, the feedback controller FB carries out a feedback control of the distance between the probe P and the sample surface. Meanwhile, the lock-in amplifier LK searches for a characteristic point, as explained earlier. After the characteristic point is detected, the tracking of the characteristic point is initiated. During this tracking process, the moving speed v of the sample is determined, as described previously.

After the moving speed v of the sample S is detected, the values of the moving speed v and time t are given to the SPM controller, as shown in FIG. 1(b). The SPM controller uses those values as the correction terms for controlling the movement of the sample stage during the process of observing the sample surface. Thus, the change in the relative position of the probe and the sample due to a thermal drift or similar variance is compensated for, so that a correct image of the sample surface is obtained.

As stated earlier, observing a sample usually takes from only a few to several minutes. Therefore, the relative position can sufficiently be corrected by using the moving speed v detected prior to the observation. However, if the observation takes a long time or the ambient temperature steeply changes, it is preferable to update the moving speed v during the observation by suspending the observation at an appropriate time and re-detecting the moving speed v, as indicated by the broken line in FIG. 2(a). For this purpose, the change Δv of the moving speed v can be measured while the position-correcting operation shown in FIG. 1(b) is continued. Then, the moving speed v is updated to v+Δv.

The description thus far focused on the construction and operation of the present invention applied to a normal type of SPM. The following description focuses on another example in which the present invention is applied to a non-contact atomic force microscopy (NC-AFM) using a frequency detection technique. Applying the present invention to the NC-AFM will improve the measurement accuracy.

FIGS. 4(a) and 4(b) show the relationship between the resonance frequency and the oscillation amplitude of the NC-AFM. The NC-AFM includes a probe 10 fixed to the tip of a cantilever 11 consisting of a micro-sized flat spring or similar member whose length is very short, e.g. 100-200 μm. The probe 10 oscillates at a frequency equal to the natural frequency (resonance frequency) fr of the cantilever 11. The resonance frequency fr is approximately given by fr½π×√(k/m), where k is the spring constant of the cantilever 11 and m is the mass of the probe 10. In the frequency modulation method, the probe 10 is oscillated at the resonance frequency fr with a predetermined amplitude R and brought closer to the sample surface (the atom 50) (FIG. 4(a)). When the probe is in the vicinity of the surface of the atom 50, a mechanical interaction works between the probe 10 and the atom 50. This causes a change in the resonance frequency fr of the cantilever 11 (frequency shift=Δf). The frequency shift Δf takes negative values when an attracting force is working between the probe 10 and the atom 50 (as indicated by the dashed-and-dotted line in FIG. 4(b)) or positive values when a repulsive force is working (as indicated by the dashed-and-two-dotted line in FIG. 4(b)). In normal NC-AFMs, various measurements are performed within the range of the repulsive force, where the probe 10 is out of contact with the atom 50.

In the process of detecting and imaging (or visualizing) the condition of the sample surface with the NC-AFM, the probe 10 (or sample) is moved in two directions perpendicular to the surface normal to the sample surface, like the scanning line of a television, and the amount of change in the frequency shift Δf is mapped for each point on the sample surface. The moving operation needs only to change the relative position of the probe 10 and the sample. Which of the two elements is actually moved in the moving operation depends on the construction of the system used.

There are two imaging methods: One is the varied-frequency imaging, which produces an image on the basis of the change in the frequency shift Δf which varies when the probe 10 scans the sample. The other is the fixed-frequency imaging, in which the distance of the probe 10 is controlled to maintain the frequency shift Δf at a certain level during the scanning operation, and an image is produced on the basis of the change in the distance. The latter method is said to be able to produce an image reflecting the change in the height of the sample surface. However, it needs a feedback control of the distance between the probe and the sample in order to follow the scanning speed. The former method in principle does not need such a feedback control of the distance. However, it must compensate for a gradual change in the distance between the probe and the sample caused by a thermal drift or creep of the system. Accordingly, an integral feedback with very low responsiveness must be performed so that the probe follows only the gradual distance change caused by the thermal drift or creep.

Figure 5:
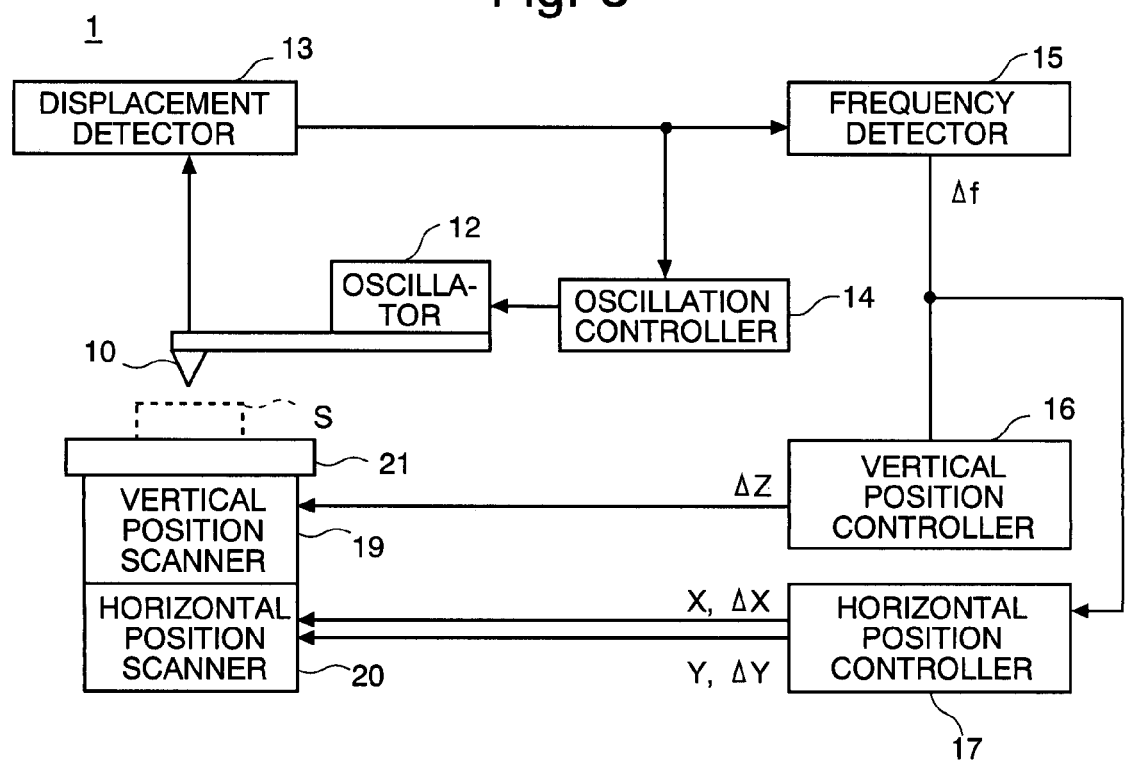
FIG. 5 is a block diagram showing the construction of an atom position-fixing system as an embodiment of the present invention.

FIG. 5 is a block diagram showing the construction of an atom position-fixing system as an embodiment of the present invention. The present atom position-fixing system 1 includes the following units: a scanning unit having a cantilever 11, a probe 10 fixed to the tip of the cantilever 11, and an oscillator 12 consisting of a piezoelectric element attached to the other end of the cantilever 11; a position-scanning unit having a sample retainer 21 on which an objective sample S is to be placed, a vertical position scanner 19 and horizontal position scanner 20 for three-dimensionally actuating the sample retainer 21; and a control unit including a displacement detector 13, oscillation controller 14, frequency detector 15, vertical position controller 16 and horizontal position controller 17. Each component of the control unit is controlled by a computer (not shown), such as a personal computer.

An example of the probe 10 is an arc-shaped silicon of 10 μm in length and roughly a few μm in diameter. Such a micro0size probe 10 can be created by microfabricating a semiconductor. The probe 10 can be made of any material. In the case of using a surface observation probe made of silicon, it is recommended to remove oxides and foreign matters from the surface of the probe to improve the sensitivity to the interatomic force and thereby enhance the resolution.

The oscillator 12 shakes the cantilever 11 to oscillate the probe 10. For example, it consists of a piezoelectric element, which changes its shape when a voltage is applied. The cantilever has a probe holder at the position where the probe is to be attached. This holder facilitates the attachment or replacement of the probe 10, which is a disposable component.

The displacement detector 13 produces a signal reflecting the displacement of the probe 10. There are several types as follows: an optical lever type, which is used in commercially available AFMs, consisting of a light source and a split optical detector (Seizo MORITA ed., "Sousa Gata Puroobu Kenbikyou; Kiso To Mirai Yosoku (Scanning Probe Microscope; Fundamentals and Future Prediction)", Maruzen, Tokyo (2000)); an optical interference type, which uses the interference of optical fibers (D. Rugar et al., *Applied Physics Letters*, Vol. 55(1989), p. 2588); a tuning type, in which a subtle change in the electric current generated by a quartz built in the probe is converted into a voltage (P. Guenther et al., *Applied Physics B*, Vol. 48, p. 89(1989)); a Q-pulse sensor type (F. J. Giessibl, *Applied Physics Letters*, Vol. 73); a piezoresistance type, which detects the displacement of the probe as a resistance change (F. J. Giessibl, *Science*, Vol. 267(1995), p. 68); and a piezoelectric type, which detects the displacement of the probe as a voltage change (J. Rychen et al., Review of Scientific Instruments, Vol. 70(1999), p. 2765).

The frequency detector 15 detects the change of the resonance frequency (the frequency shift Δf) caused by the mechanical interaction acting on the probe 10. For example, the frequency detector 15 can be composed of a phase lock loop (PLL), a resonance circuit using an inductor and capacitor, various kinds of filters and other components.

When the probe 10 is brought closer to the sample S, the effective spring constant of the cantilever 11 changes due to the mechanical interaction that works between the probe 10 and the sample S, so that the resonance frequency changes. The displacement detector 13 determines the amount of displacement of the probe 10 located at one end of the cantilever 11. Based on the detected amount of the displacement, the frequency detector 15 determines the change in the resonance frequency (or frequency shift Δf) of the cantilever 11 caused by the interaction between the probe 10 and the sample S. An FM demodulator (not shown) generates a signal reflecting the amount of the detected change of the mechanical resonance frequency and sends it to the controller 10.

The oscillation controller 14 controls the oscillation of the probe 10. It has two operation modes: One is the fixed oscillation-amplitude mode, in which the oscillation amplitude of the probe 10 is maintained at the same level, and the other is the fixed oscillation-signal mode, in which the amplitude of the signal fed to the oscillator 12 is maintained at the same level. Optionally, a phase shifter may be used to efficiently oscillate the probe 10. The oscillation amplitude signal may be multiplied by a certain gain and fed to the oscillator 12. The signal generated by the transmitter of the PLL used in the frequency detector 15 can be shared by the oscillation controller 14.

The vertical position scanner 19 changes the vertical position of the probe 10 and the sample S, i.e. the relative position between the probe 10 and the sample S along the direction vertical to the sample surface. For example, it may consist of a piezoelectric element, which changes its shape when a voltage is applied.

The horizontal position scanner 20 changes the horizontal position of the probe 10 and the sample S, i.e. the relative position between the probe 10 and the sample S along the direction parallel to the sample surface. Similar to the vertical position scanner 19, it may consist of a piezoelectric element. Examples include a tube scanner type using a tube-like cylindrical piezoelectric element, a single-layer type using a single-layer piezoelectric element, and a multi-layer type using a stack of piezoelectric elements.

In the present example, the vertical position scanner 19 and the horizontal position scanner 20 are provided for the sample retainer 21. However, one or both of them can be provided on the side of the probe 10 as long as the relative position of the probe 10 and the sample S can be independently changed in the vertical and horizontal directions. The two scanners 19 and 20 may be combined together, as in FIG. 5, or separated. If the horizontal position scanner 20 is a tube scanner, it is possible to add the horizontal scanning signal to the vertical scanning signal and feed the resultant signal to the horizontal position scanner 20 so that it also functions as the vertical position scanner 19. The oscillator 12 may also be used as the vertical position scanner 19.

The vertical position controller 16 regulates the distance $\Delta Z$ between the probe 10 and the sample S so that the frequency shift $\Delta f$ is maintained at a preset level. This controller supports both of the aforementioned two imaging methods: the varied-frequency method and fixed frequency method. Basically, it consists of a feedback circuit for performing one or more of the proportional, integral and differential controls by digital calculations using an analog circuit or digital signal processor (DSP). The vertical position controller 16 has the function of measuring the distance change caused by a thermal drift or similar variance to calculate the Z-direction speed of the thermal drift and then multiplying the speed with time to obtain a correction value, which is to be added to the output. Owing to this function, the relative change in the Z-direction position of the probe and the sample caused by the thermal drift or similar variance is compensated for.

Particularly, use of a DSP makes it possible to use various filters specific to digital controls other than the aforementioned controls. The distance control may include the following operation modes: RUN (execute the control program), HOLD (temporarily stop the control) and RESET (reset the control signal to zero). These operations can be performed by the user or automatically by the software running on the computer.

The horizontal position controller 17 is used to horizontally hold the tip of the probe 10 at a designated (objective) atom position for a long time by correcting the change in the relative position of the probe 10 and the sample S caused by a thermal drift or creep in terms of the movement in two directions parallel to the sample S (X, $\Delta X$, Y and $\Delta Y$). In practice, to hold the tip of the probe 10 at the designated atom position for a long time, the horizontal position controller 17 generates an oscillation signal to oscillate the probe 10 (or sample) as shown in FIG. 3. Simultaneously, the horizontal position controller 17 receives the output signal of the frequency detector 15, which corresponds to the oscillation signal, to carry out a feedback control. Specifically, the horizontal position is feedback-controlled so that the frequency components $f_1$ and $f_2$ (or $f_0$) detected by the frequency detector 15 are each maintained at zero, whereby the probe 10 is maintained at the designated atom position (e.g. at the top of the atom) for a long time. The horizontal position controller 17 also has the function of measuring the distance change caused by a thermal drift or similar variance to calculate the X-direction and Y-direction speeds of the thermal drift and then multiplying the speeds with time to obtain correction values, which are to be added to the output. Owing to this function, the relative change in the X-direction and Y-direction positions of the probe and the sample caused by a thermal drift or similar variance is compensated for.

Figure 6:
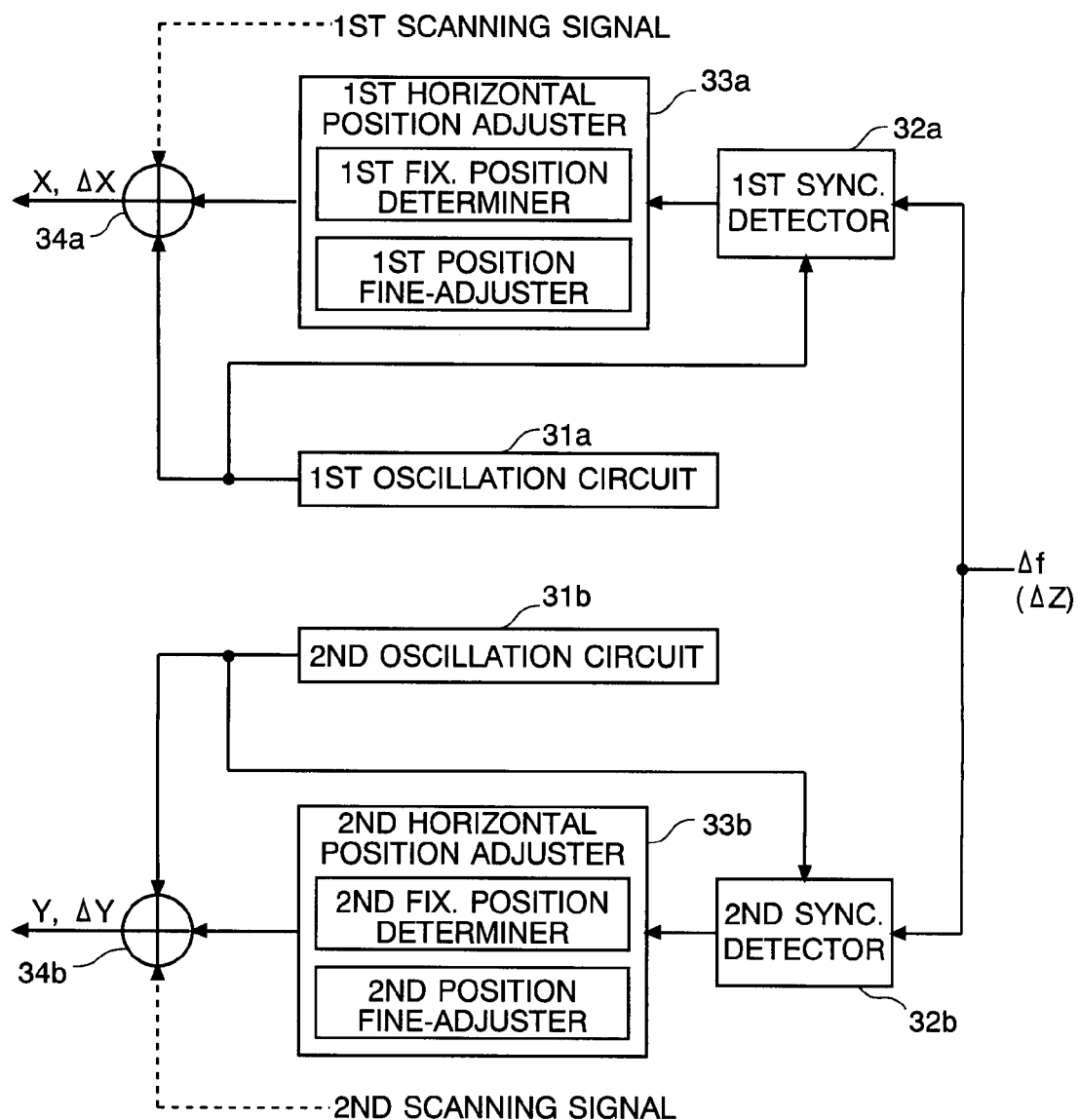
FIG. 6 is a block diagram showing an example of the section of the horizontal position controller for calculating the thermal drift speed.

Next, the section of the horizontal position controller 17 for calculating the thermal drift speed is described. This section is characteristic of the present invention. FIG. 6 is a block diagram showing an example of the section of the horizontal position controller for calculating the thermal drift speed. To independently control the position in the X-direction (first direction) and the Y-direction (second direction), the horizontal position controller 17 hereby includes a first oscillation circuit 31a, first synchronous detector 32a, first horizontal position adjuster 33a and first adder 34a for the X-direction control, and a second oscillation circuit 31b, second synchronous detector 32b, second horizontal position adjuster 33b and second adder 34a for the Y-direction control.

The first oscillation circuit 31a (second oscillation circuit 31b) is used to periodically change the relative position of the probe 10 and the sample (atom 50) in the X (Y) direction at a frequency of $f_1$ ($f_2$). Its output signal is sent to the first synchronous detector 32a (second synchronous detector 32b) and the first adder 34a (second adder 34b).

The oscillation generated by the first oscillation circuit 31a (second oscillation circuit 31b) is different from the Z-direction resonance oscillation given to the cantilever for the purpose of surface observation. Its oscillation frequency must be significantly lower than the resonance frequency.

The first synchronous detector 32a (second synchronous detector 32b) synchronously detects the frequency shift $\Delta f$ outputted from the frequency detector 15, using the output signal of the first oscillation circuit 31a (second oscillation circuit 31b) (i.e. the frequency of the output signal of the oscillation circuit) or its harmonic signal (i.e. an integral multiple of the frequency of the output signal of the oscillation circuit). The detected frequency signal is sent to the first horizontal position adjuster 33a (second horizontal position adjuster 33b).

The first horizontal position adjuster 33a (second horizontal position adjuster 33b) includes a first fixation point determiner (second fixation point determiner) and a first position fine-adjuster (second position fine-adjuster), which will be detailed later. It converts the aforementioned frequency signal to a signal for adjusting the X-direction (Y-direction) position of the probe 10 or sample (atom 50) and sends that signal to the first adder 34a (second adder 34b).

The first adder 34a (second adder 34b) adds the signals received from the first oscillation circuit 31a (second oscillation circuit 31b) and the first horizontal position adjuster 33a (second horizontal position adjuster 33b) to the first scanning signal (second scanning signal). The resultant signal is sent to the horizontal position scanner 20. The signal supplied from each oscillation circuit to each synchronous detector serves as a reference signal used in the synchronous detection process. According to necessity, this signal may be amplified at a certain gain.

Figure 7:
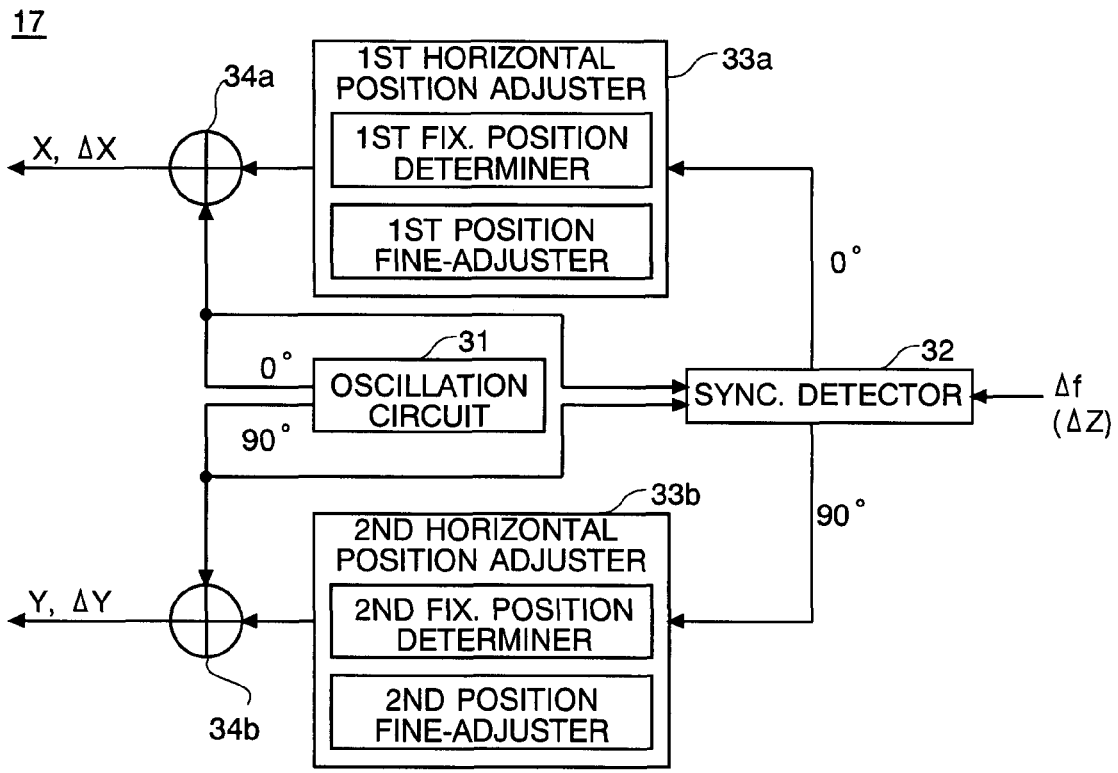
FIG. 7 is a block diagram showing another example of the section of the horizontal position controller for calculating the thermal drift speed.

FIG. 7 is a block diagram showing another example of the section of the horizontal position controller for calculating the thermal drift speed. This construction is suitable for such cases where two signals of the same frequency with a phase difference of 90 degrees are used for two directions bisecting at right angles (as in FIG. 3(b)). The horizontal position controller 17 includes an oscillation circuit 31, a synchronous detector 32, the first horizontal position adjuster 33a paired with the first adder 34a, and the second horizontal position adjuster 33b paired with the second adder 34b.

The oscillation circuit 31 periodically changes the relative position of the probe 10 and the sample (atom 50) at a frequency of $f_0$. It generates two synchronous signals having different phases. In the present example, the two signals have a phase difference of 90 degrees (0 and 90 degrees). The signal having a phase of 0 degrees is sent to the first adder 34a, and the signal having a phase of 90 degrees to the second adder 34b. These signals are also fed to the synchronous detector 32 so that the synchronous detector 32 can separately extract the X-direction and Y-direction components.

The synchronous detector 32 synchronizes the frequency shift $\Delta f$ outputted from the frequency detector 15 with the signal generated by the oscillation circuit 31 or its harmonic signal and detects the two signals having different phases (0 and 90 degrees in the present case). The two signals are sent to the first horizontal position adjuster 33a and the second horizontal position adjuster 33b, respectively. The other components are the same as those in FIG. 6.

The present construction uses only one synchronous detector and is accordingly simpler. In the construction in FIG. 6, the frequency difference $|f_1 - f_2|$ must be adequately large within the range supported by the synchronous detectors. Such a frequency difference is unnecessary in the present case. However, for the synchronous detector 32 to detect two signals having different phases, the phases of the two output signals of the oscillation circuit 31 need to be fixed. In practical measurements, these signals pass through various circuits. Therefore, it is necessary to carry out phase matching by giving a signal to either X-direction or Y-direction.

Figure 8:
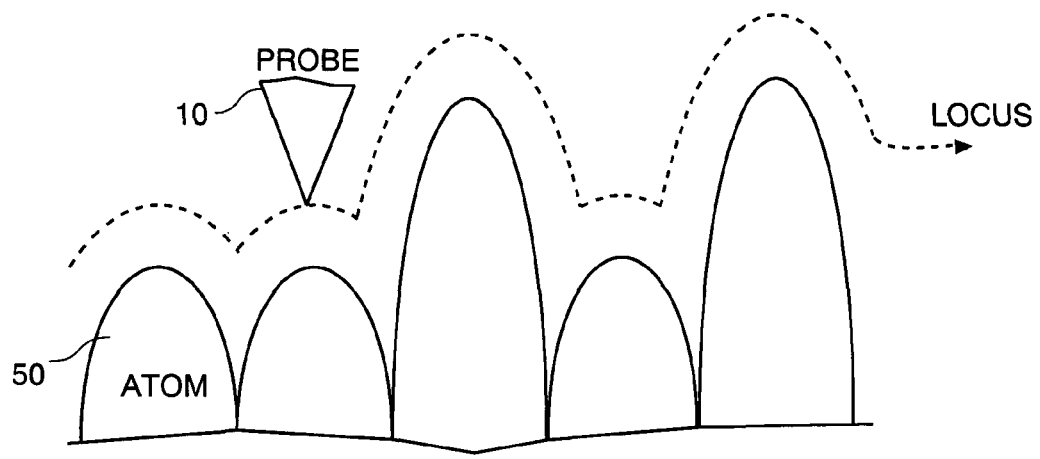
FIG. 8 illustrates the function of the fixation point determiner.

FIG. 8 illustrates the function of the fixation point determiner.

The fixation point determiner is used to determine the atom position at which the probe 10 is to be fixed. It changes the relative position of the probe and the atom by setting the horizontal position adjusters 33a, 33b and 33 (these adjusters function as a controller) to the HOLD mode and adding a predetermined voltage to each of the output signals of the three adjusters. Alternatively, a signal equivalent to the signal of the fixation point determiner may be added to each of the scanning signals. The objective point can be determined through a software program. After the probe 10 is brought into the vicinity of the objective position, the controller (i.e. the horizontal position adjusters 33a, 33b and 33) is set to the RUN mode, whereby the probe 10 is fixed at the objective point. The RUN mode has two options: one is the feedback control of the horizontal position and the other is the addition of correction values using the thermal drift speed. Users can select one or both of the options to be enabled (or RUN). It should be noted that the following description sometimes omits the statement about which option is enabled (RUN) or disabled (HOLD). The aforementioned options can be enabled/disabled also for the Z-direction, but their status will not always be referred to, either. In some kinds of measurement, the thermal drift speed changes even after the correction value has been added. In such a case, it is possible to perform a feedback control to further correct the horizontal (or vertical) position after adding the correction value to that position. This method allows the feedback mechanism to be lower in responsiveness. This means that its bandwidth will be narrower and the noise will be reduced accordingly.

FIGS. 9(a)-9(d) illustrate the function of the position fine-adjuster.

The position fine-adjuster is used to adjust the so-called "set point" in the feedback control. It finely adjusts the horizontal position according to necessity. Without the position fine-adjuster, the position of the probe can be fixed only at the top of a convex portion, the bottom of a concave portion or a saddle point. The position fine-adjuster offers more flexibility; the probe can be fixed at a distance of $\Delta x$ from the top of the atom 50 by giving the input signal of the controller an appropriate offset, i.e. by adding or subtracting a signal corresponding to the objective set point. Specifically, at the top of the atom 50 (FIG. 9(a)) or the bottom of a void defect (FIG. 9(b)), the voltage added by the position fine-adjuster is set to zero. Then, the controller finely adjusts the relative position of the probe 10 and the sample (atom 50) so that the input signal (i.e. the output of the synchronous detector) becomes zero. If the voltage added by the position fine-adjuster is not zero, the synchronous detector generates a value reflecting that voltage, so that the relative position horizontally changes.

FIGS. 10(a)-10(d) show examples of the fixation points.

To fix the position of the probe 10, two mutually perpendicular axes (X and Y) parallel to the sample surface are defined, and the horizontal position is independently controlled in each direction. For example, the probe 10 may be fixed at the top of the atom 50 (FIG. 10(a)), at a hole created by a void defect or surface reconstruction (FIG. 10(b)), at a valley between the atoms 50, 50 (FIG. 10(c)), or at a point that can be regarded as the top of the atom in one direction and as the valley in the perpendicular direction (FIG. 10(d)). In FIGS. 10(a)-10(d), the atoms are depicted as the white circles. It should be noted that atoms 50 do not always appear as elevated portions on the image. The interaction between the tip of the probe 10 and the electrons surrounding the atom 50 on the sample surface can cause the resultant image to be different from the actual geometry of the sample surface. In such a case, it is possible to assume that the atoms 50 are imaged at elevated portions.

FIGS. 11(a)-11(d) show examples of line profiles.

Figure 11:
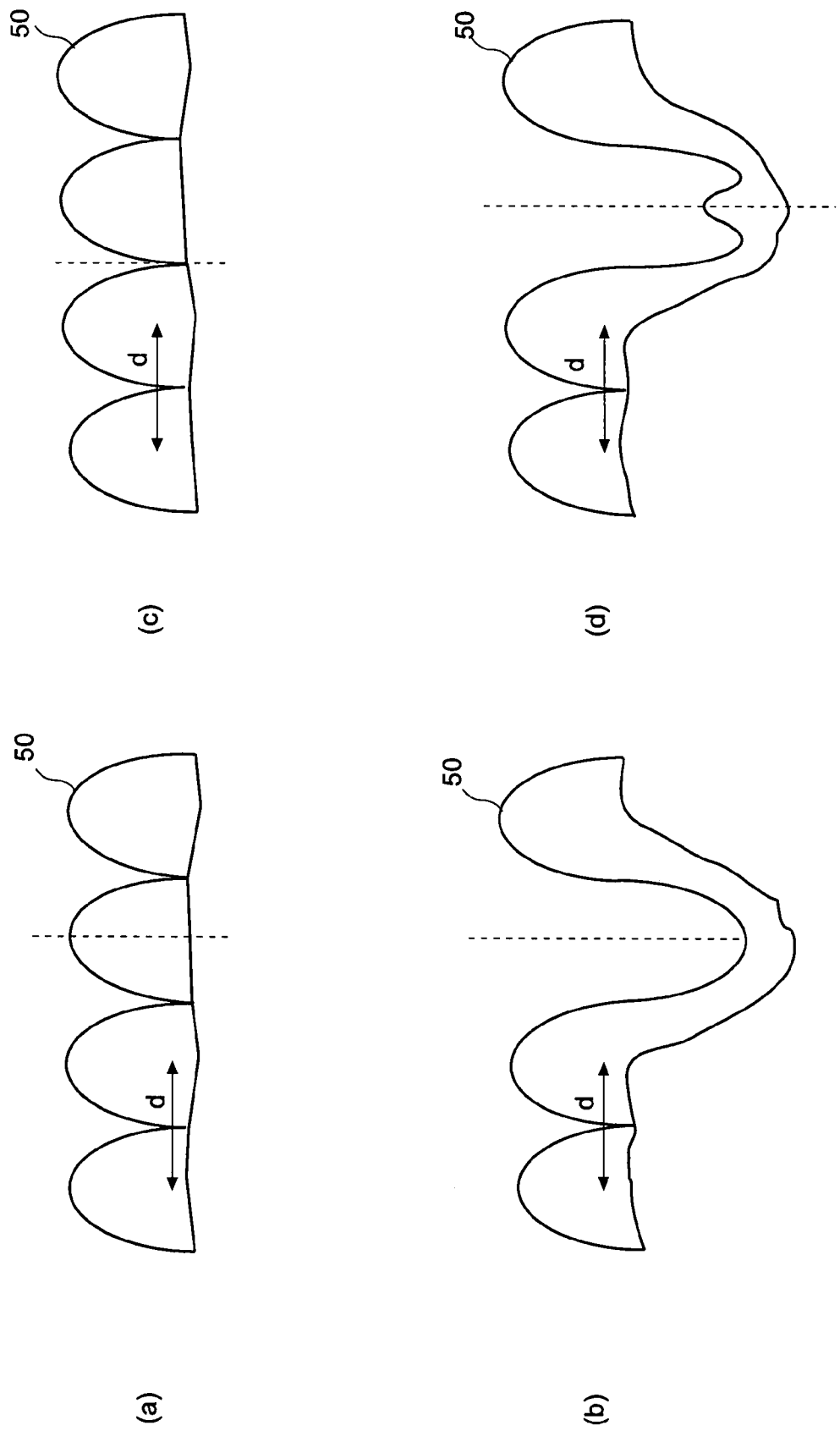
FIGS. 11(a)-11(d) show examples of line profiles.

Since the feedback control can be independently performed for the two mutually perpendicular axes, there are several portions of the line profile to be considered, such as the top of a peak in the line profile (FIG. 11(a)), a bottom of the line profile (FIG. 11(b)), a valley of the line profile (FIG. 11(c)), and a bottom of the line profile where a portion of the substrate or an atom of the next layer is observed (FIG. 11(d)). In FIG. 11(a), the amplitude R of the signal generated by the oscillation circuit is smaller than one half of the interatomic distance (R<d/2), and the signal is synchronously detected by the synchronous detector at the frequency $f_0$ ($f_1$, $f_2$) generated by the oscillation circuit. In FIGS. 11(b) and 11(c), the probe can be fixed at the bottom point by inverting the output signal of the horizontal position controller. In FIG. 11(d), if the detected signal is noticeable enough to track the substrate or the atom of the next layer, the probe can be fixed by the same method as in the previous cases. If not, a signal whose amplitude R is larger than the interatomic distance d (R>d) is used. This signal is synchronously detected at a frequency of $2f_0$ ($2f_1$, $2f_2$), and the controller performs the feedback control so that the signal is maximized. Thus, the synchronous detection can be performed not only at the frequency of the output signal of the oscillation circuit but also at its harmonic frequency (i.e. an integral multiple of the frequency of the output signal of the oscillation circuit).

The present inventors have evaluated a method for correcting an atom position control, using an atom position-fixing system according to an embodiment of the present invention. FIGS. 12(a) and 12(b) show images of the surface of Si(111) 7×7 obtained before and after the position control was corrected. FIGS. 13(a) and 13(b) show an example of the position control correction on the surface of Si(111)7×7.

After the image shown in FIG. 12(a) had been obtained, the probe was quickly moved to the point indicated by the arrow, and the horizontal and vertical feedback controls were started (RUN) to fix the position of the probe. Sixty-one minutes later, the control was set to the HOLD mode to obtain another image (FIG. 12(b)). Both images show the same foreign matter (indicated by the circles) deposited at the same location. This proves that the same images are identical. In other words, the two images demonstrate that, despite the thermal drift that took place during the 61-minute period, the probe was successfully controlled to follow (or track) the designated point. As shown in FIG. 13(a), the point moved about 135 Å within the XY plane during the 61-minute period. This suggests that the probe 10 would be displaced from the correct position by about 135 Å if the atom position-fixing system of the present embodiment were not used. These results prove that the atom position-fixing system of the present embodiment can maintain the relative position of the probe 10 with respect to the atom 50 for a long time in a stable manner. FIG. 13(b) shows that the noise level was 0.2 Å, which is negligibly small in comparison to the interatomic distance (7.5 Å in the present case). The position fixation by the horizontal and vertical feedback allows the user to continuously observe the same range of the sample by sight. However, when an image is to be recorded, the feedback must be set to the HOLD mode. This will make the resultant image distorted, as shown in FIG. 12(c). This problem can be avoided as follows: First, the horizontal and vertical feedback is set to the RUN mode to fix the probe at the objective position and calculate the thermal drift speed. Then, the horizontal and vertical feedback set to the HOLD mode, and a voltage corresponding to the correction value is added (i.e. the corrected RUN mode). The image recorded in this mode is free from distortion, as shown in FIG. 12(d). According to this technique, an environment free from the thermal drift like an ultracold environment can be created even at normal temperatures. For example, it is possible to perform a high-resolution measurement of a biological sample that is rather asymmetrical when it is in a liquid.

An application of the present invention is described. FIGS. 14(a) and 14(b) are conceptual diagrams of a mechanical spectroscopic measurement (distance-dependent measurement).

The magnitude of the frequency shift Δf which takes negative values in the present case, increases as the probe 10 comes closer to the sample. Therefore, a curve that describes the relationship between the frequency shift Δf and the distance Z between the atom and the probe can be obtained by measuring the frequency shift Δf while moving the probe 10 toward the target atom 50. Using this curve with an algorithm for converting the frequency shift Δf to a force value enables the measurement of the bond force of the atom. Conventionally, it was difficult to perform a spectroscopic measurement of an atom at a designated position at room temperature, because the relative position of the probe 10 and the sample changed with time due to the thermal drift or creep. The probe position control method according to the present invention makes it possible to hold the probe 10 at a desired atom 50. Therefore, the bond force of the atom 50 can be measured even at room temperature.

FIGS. 15(a)-15(d) are diagrams showing an example of the mechanical spectroscopic measurement (distance-dependent measurement).

Figure 15:
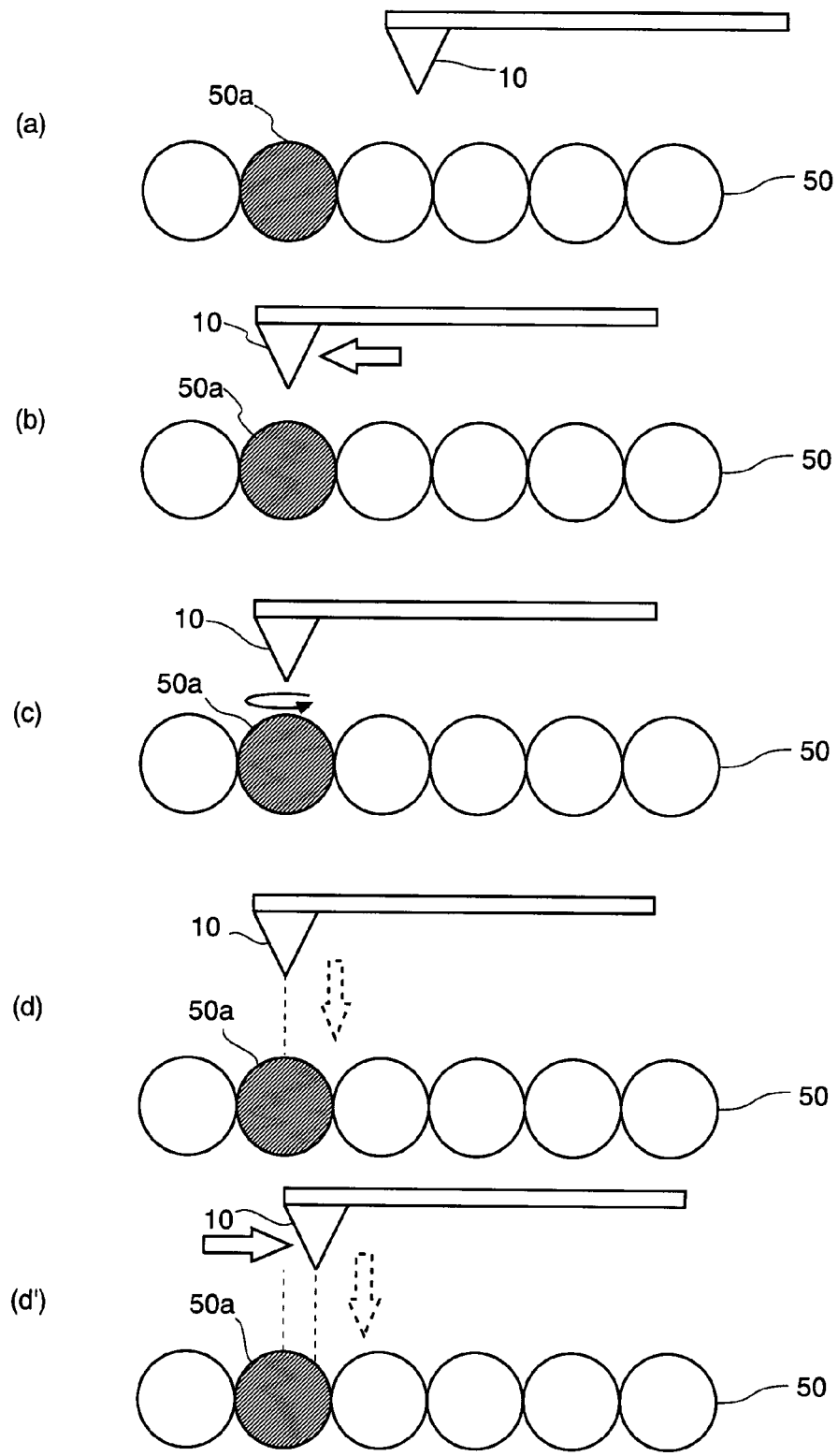
FIGS. 15(a)-15(d) are diagrams showing an example of the mechanical spectroscopic measurement (distance-dependent measurement).

First, one of the atoms 50, 50 on the sample surface is selected as the atom 50a for which the distance-dependent measurement is to be performed (FIG. 15(a)). Then, the probe 10 is transferred to the position of the selected atom 50a (FIG. 15(b)). At this moment, the probe 10 is not right above the atom 50a and their relative position is continuously changing due to the thermal drift. Next, the horizontal position of the probe 10 with respect to the atom 50a is fixed by the probe position control method according to the present invention (FIG. 15(c)). Then, the vertical position of the probe 10 with respect to the atom 50a is changed to perform the distance-dependent measurement (FIG. 15(d)). Additionally, the position fine-adjuster may also be used to hold the probe 10 at a position slightly displaced from the atom fixation point of the expected line profile and perform the distance-dependent measurement at that position (FIG. 15(d')).

Figure 16:
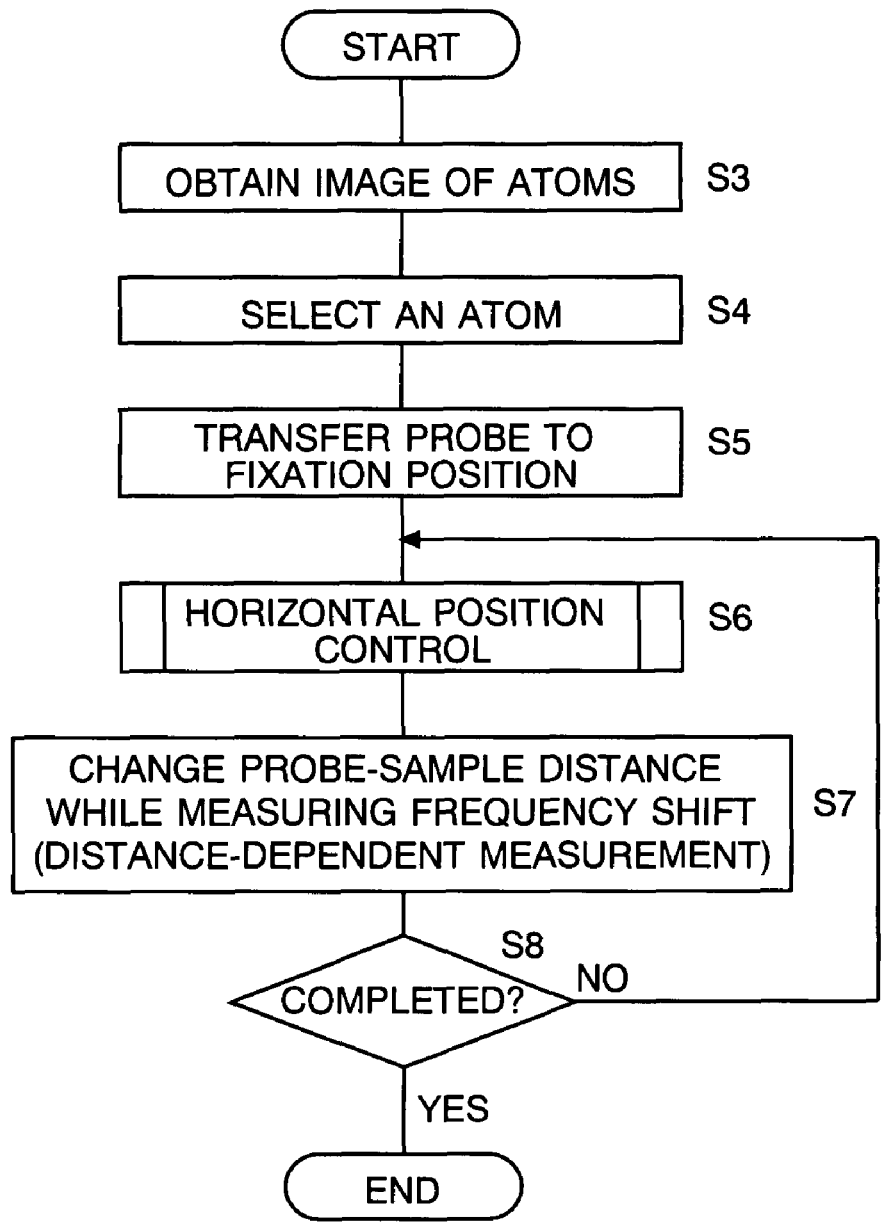
FIG. 16 is a flow chart of an example of the mechanical spectroscopic measurement (distance-dependent measurement).

FIG. 16 is a flow chart of an example of the mechanical spectroscopic measurement (distance-dependent measurement).

Using a scanning probe microscope, the sample surface is scanned to obtain an image of the atoms 50, 50, ... on the sample surface (Step S3). On this image, one of the atoms 50, 50, ... is selected as the atom 50a for which the distance-dependent measurement is to be performed (Step S4). Then, the probe 10 is transferred to the fixation point (Step S5) and the horizontal position control is performed (Step S6). Subsequently, the distance-dependent measurement is carried out by changing the distance between the probe 10 and the sample (atom 50a) while measuring the frequency shift Δf (Step S7). Then, whether or not the distance-dependent measurement has been completed is checked (Step S8). If the distance-dependent measurement is completed (Step S8: YES), the entire process is discontinued. If the distance-dependent measurement is not completed (Step S8: NO), the process returns to Step S6 to perform the horizontal position control again and continue the distance-dependent measurement.

Figure 17:
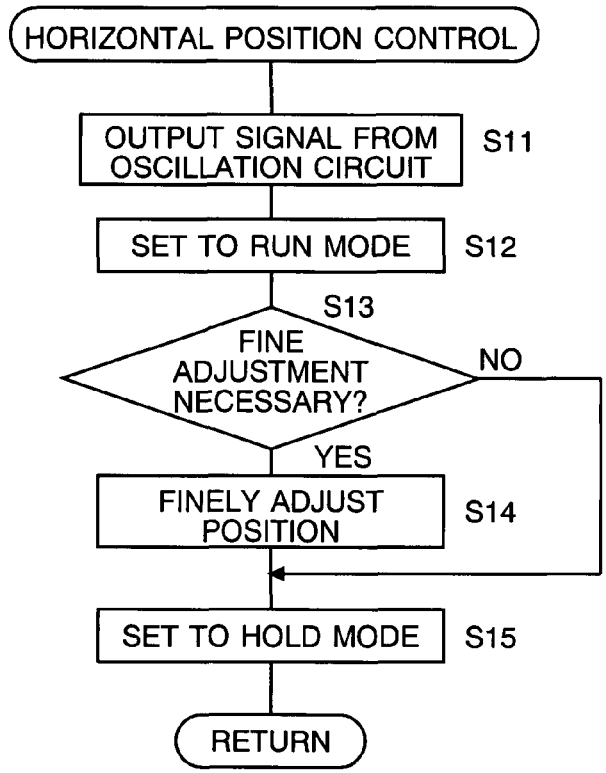
FIG. 17 is a flow chart of an example of the horizontal position control.

The horizontal position control is performed as a subroutine. FIG. 17 is a flow chart of an example of the horizontal position control. While the oscillation circuits (first oscillation circuit 31a, second oscillation circuit 31b (oscillation circuit 31)) are generating signals (Step S11), the horizontal position controller 17 functioning as the controller is set to the RUN mode (Step S12). Then, whether or not the fine adjustment of the position is necessary is checked (Step S13). If the fine adjustment is necessary (Step S13: YES), the fine adjustment of the position is carried out (Step S14), after which the horizontal position controller 17 is set to the HOLD mode (Step S15) and the process exits the subroutine. If the fine adjustment is unnecessary (Step S13: NO), the fine adjustment of the position is skipped. Then, the horizontal position controller 17 is set to the HOLD mode (Step S15) and the process exits the subroutine.

Figure 18:
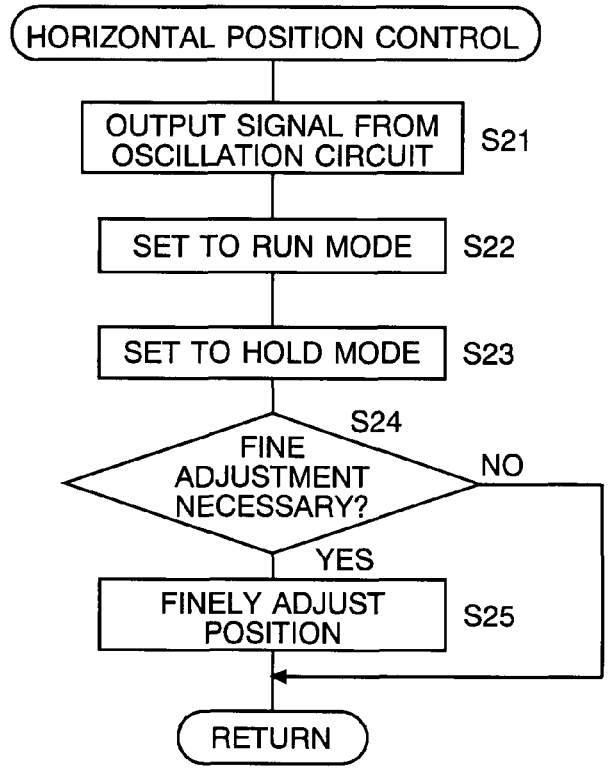
FIG. 18 is a flow chart of another example of the horizontal position control.

The flow of the subroutine of the horizontal position control is not limited to the previous one. For example, the fine adjustment of the position may be preceded by the step of setting the horizontal position controller 17 to the HOLD mode. FIG. 18 is a flow chart of another example of the horizontal position control. While the oscillation circuits (first oscillation circuit 31a, second oscillation circuit 31b (oscillation circuit 31)) are generating signals (Step S21), the horizontal position controller 17 is set to the RUN mode (Step S22). Then, the horizontal position controller 17 is set to the HOLD mode (Step S23), and whether or not the fine adjustment of the position is necessary is checked (Step S24). If the fine adjustment is necessary (Step S24: YES), the fine adjustment of the position is carried out (Step S25), after which the process exits the subroutine. If the fine adjustment is unnecessary (Step S24: NO), the process exits the subroutine without carrying out the fine adjustment of the position.

Figure 19:
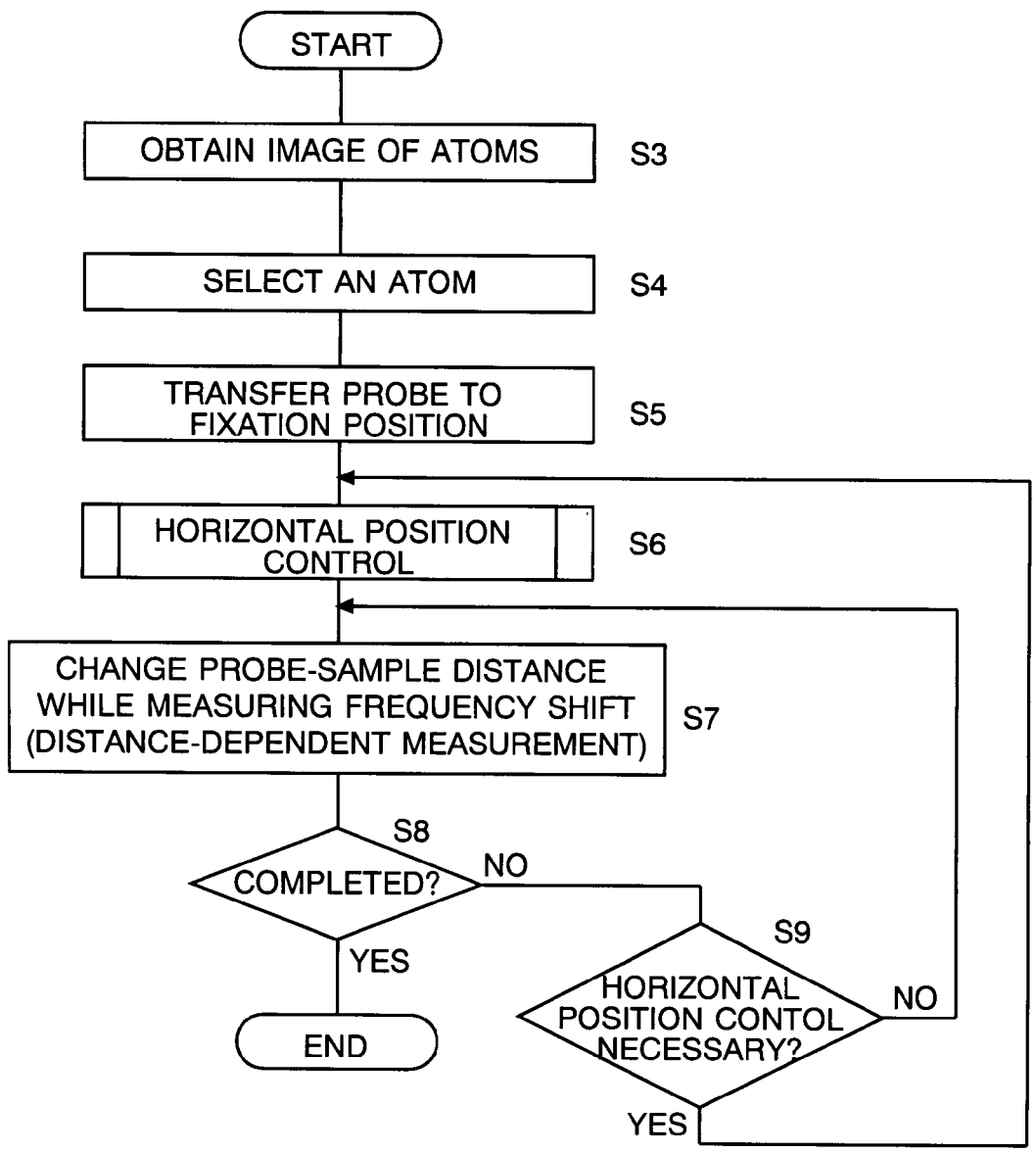
FIG. 19 is a flow chart of another example of the mechanical spectroscopic measurement (distance-dependent measurement).

In FIG. 16, the horizontal position of the probe 10 is controlled every time the distance-dependent measurement is performed. However, depending on the purpose of the measurement, the horizontal position control can be omitted. For example, when the thermal drift is negligibly small, the horizontal position control is unnecessary. Accordingly, the process shown in FIG. 16 can be modified as shown in FIG. 19. In the modified version, if the distance-dependent measurement is not completed (Step S8: NO), the process goes to Step S9 to check whether or not the horizontal position control is necessary. If the horizontal position control is necessary (Step S9: YES), the process returns to Step S6 to perform the horizontal position control and continue the distance-dependent measurement. If the horizontal position control is unnecessary (Step S9: NO), the process returns to Step S7 to continue the distance-dependent measurement without carrying out the horizontal position control.

In a conventional mechanical spectroscopic measurement, if a sample is continuously measured to obtain plural pieces of image data, the resultant images will be differently deformed and cannot be correctly overlapped with each other. The method according to the present invention yields more precise data that can be overlapped with each other within the allowable range of measurement error. Averaging these data will produce low-noise measurement data that clearly reflect even a subtle change in bond force among the atoms on the sample.

FIGS. 20(a)-20(d) are diagrams showing an example of the mechanical spectroscopic measurement (voltage-dependent measurement).

Figure 20:
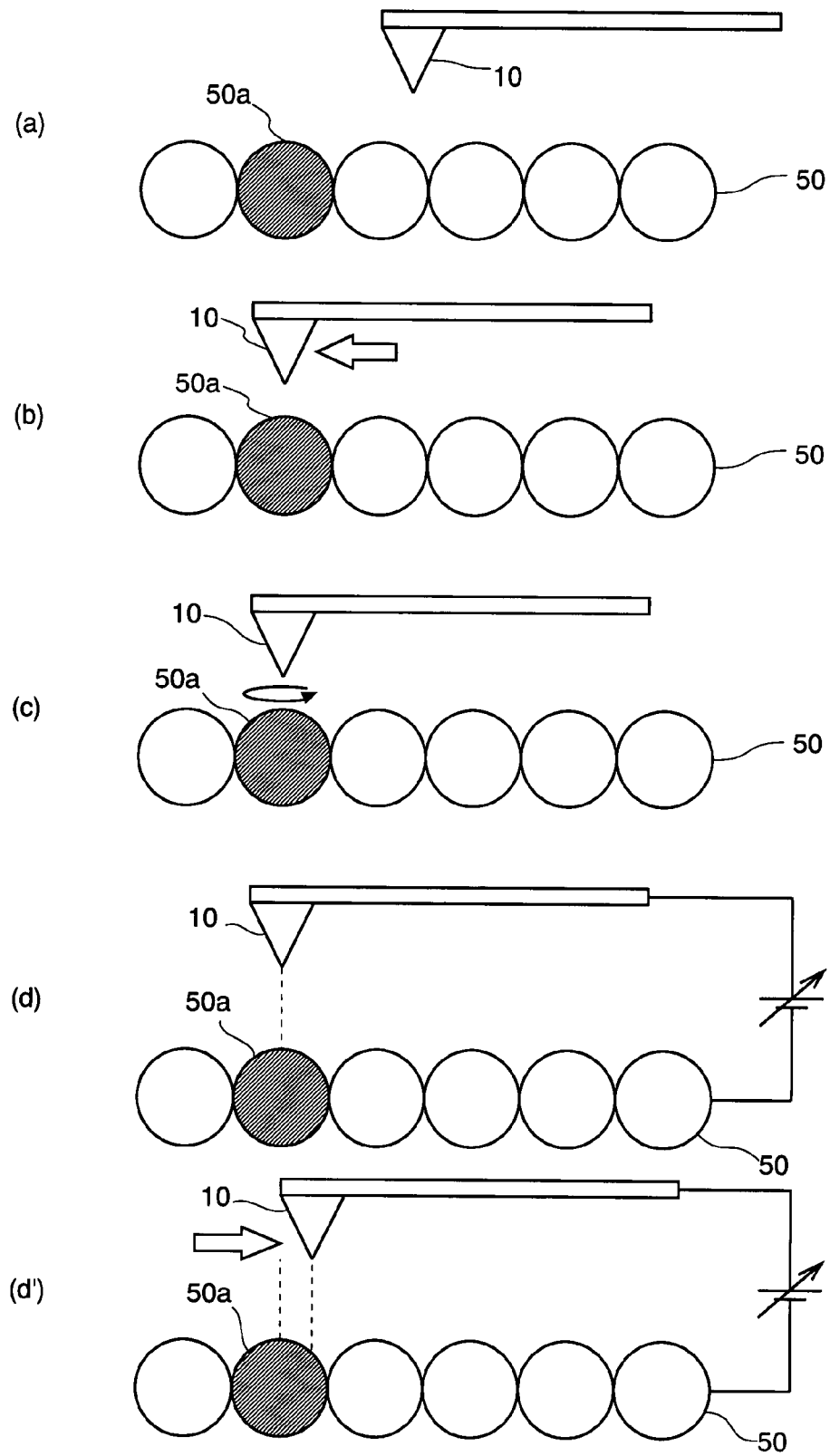
FIGS. 20(a)-20(d) are diagrams showing an example of the mechanical spectroscopic measurement (voltage-dependent measurement).

First, one of the atoms 50, 50, . . . on the sample surface is selected as the atom 50a for which the voltage-dependent measurement is to be performed (FIG. 20(a)). Then, the probe 10 is transferred to the position of the selected atom 50a (FIG. 20(b)). Next, the horizontal position of the probe 10 with respect to the atom 50a is fixed by the probe position control method according to the present invention (FIG. 20(c)). Then, a voltage is applied between the probe 10 and the atom 50a to perform the voltage-dependent measurement (FIG. 20(d)). Additionally, the position fine-adjuster may also be used to hold the probe 10 at a position slightly displaced from the atom fixation point of the expected line profile and perform the voltage-dependent measurement at that position (FIG. 20(d')).

Figure 21:
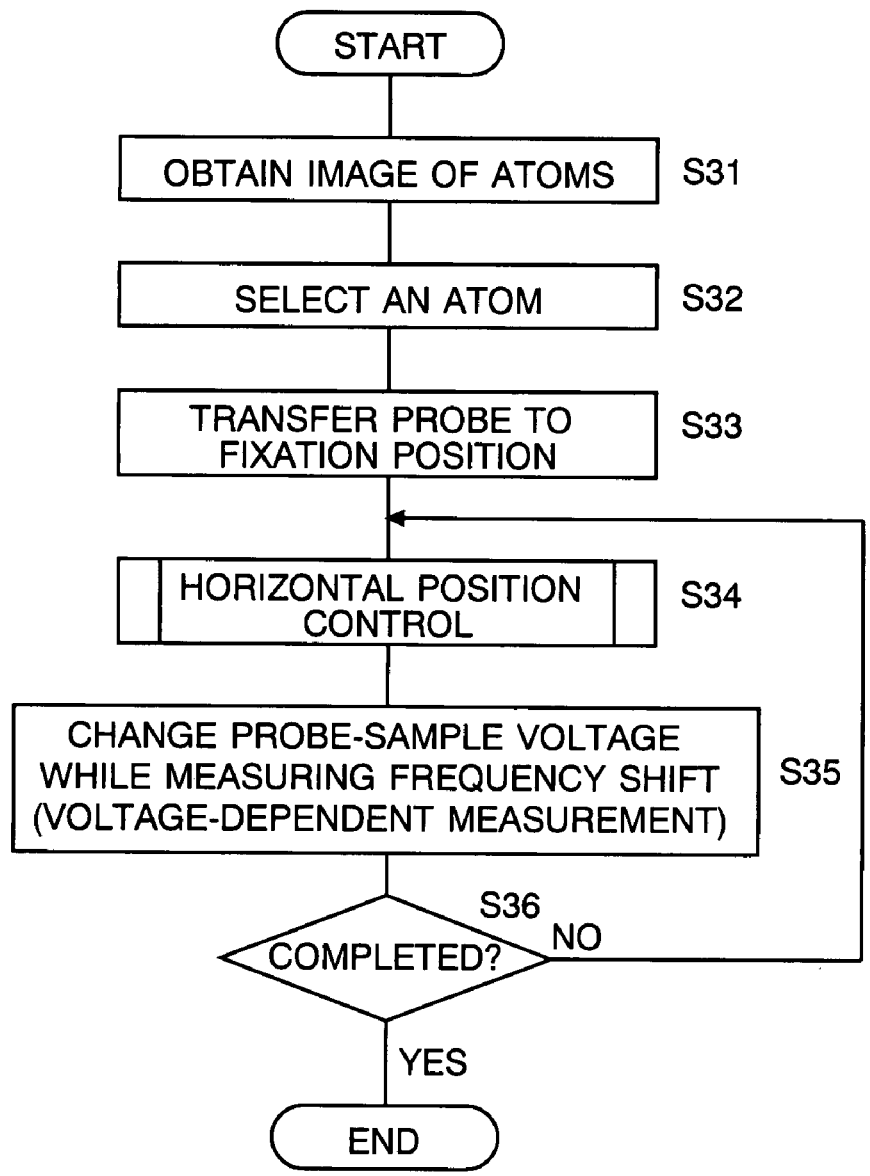
FIG. 21 is a flow chart of an example of the mechanical spectroscopic measurement (voltage-dependent measurement).

FIG. 21 is a flow chart of an example of the mechanical spectroscopic measurement (voltage-dependent measurement).

Using a scanning probe microscope, the sample surface is scanned to obtain an image of the atoms 50, 50, . . . on the sample surface (Step S31). On this image, one of the atoms 50, 50, . . . is selected as the atom 50a for which the voltage-dependent measurement is to be performed (Step S32). Then, the probe 10 is transferred to the fixation point (Step S33) and the horizontal position control is performed (Step S34). Subsequently, the voltage-dependent measurement is performed by changing the voltage between the probe 10 and the sample (atom 50a) while measuring the frequency shift $\Delta f$ (Step S35). Then, whether or not the voltage-dependent measurement has been completed is checked (Step S36). If the voltage-dependent measurement is completed (Step S36: YES), the entire process is discontinued. If the voltage-dependent measurement is not completed (Step S36: NO), the process returns to Step S34 to perform the horizontal position control again and continue the voltage-dependent measurement. The horizontal position control in Step S34 is the same as shown in FIG. 17 or 18.

Figure 22:
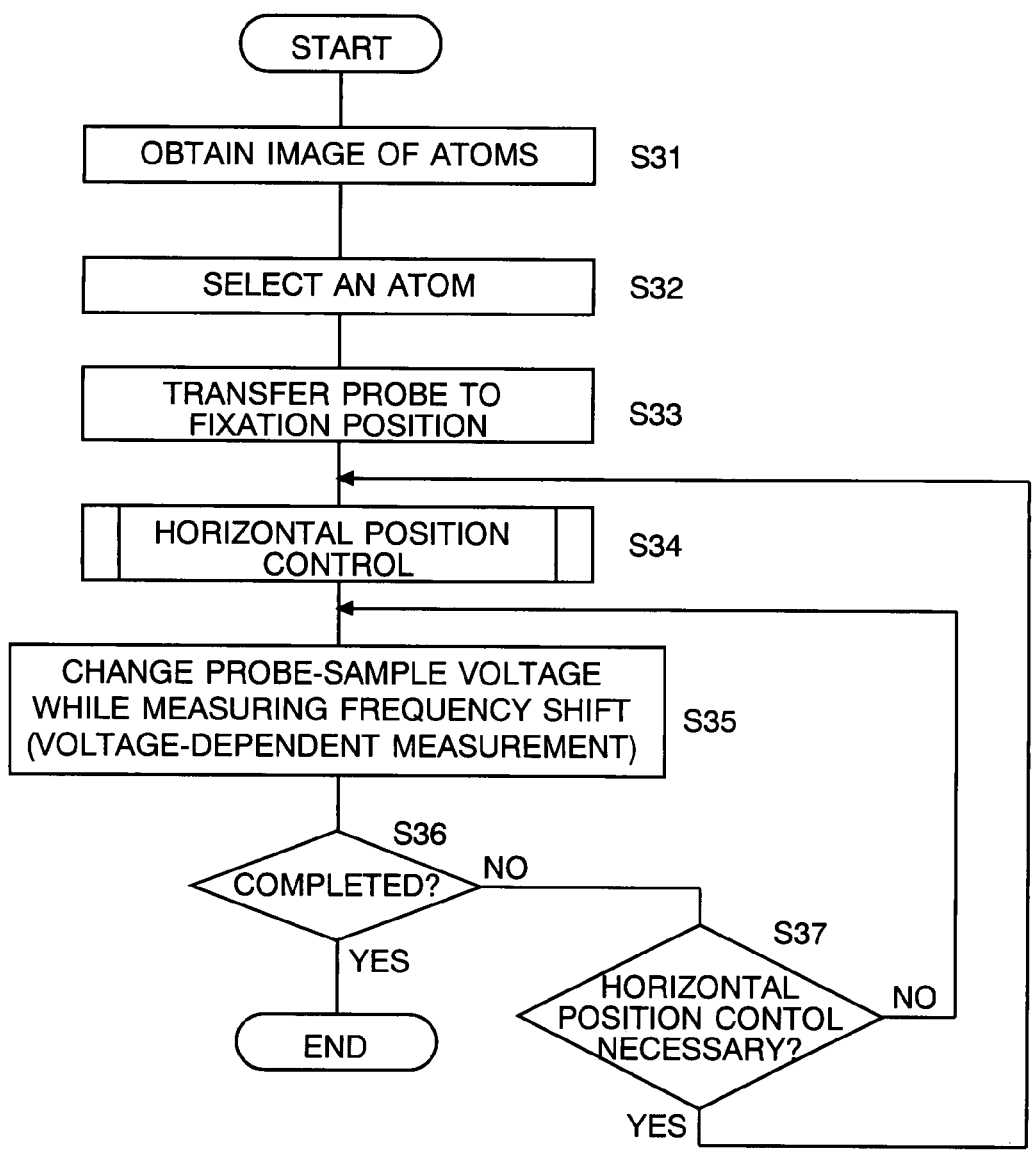
FIG. 22 is a flow chart of another example of the mechanical spectroscopic measurement (voltage-dependent measurement).

In FIG. 21, the horizontal position of the probe 10 is controlled every time the voltage-dependent measurement is performed. However, depending on the purpose of the measurement, the horizontal position control can be omitted. Accordingly, the process shown in FIG. 21 can be modified as shown in FIG. 22. In the modified version, if the voltage-dependent measurement is not completed (Step S36: NO), the process goes to Step S37 to check whether or not the horizontal position control is necessary. If it is necessary (Step S37: YES), the process returns to Step S34 to perform the horizontal position control and continue the voltage-dependent measurement. If the horizontal position control is unnecessary (Step S37: NO), the process returns to Step S35 to continue the voltage-dependent measurement without carrying out the horizontal position control.

The present invention can also be applied to a method for manipulating the position of an atom. FIGS. 23(a) and 23(b) are conceptual diagrams of the atom manipulation method.

The magnitude of the frequency shift $\Delta f$ which takes negative values in the present case, increases as the probe 10 comes closer to the sample. In this process, the frequency shift $\Delta f$ may discontinuously change under some circumstances. For example, such a change takes place when the interatomic force between the probe 10 and the atom 50 on the sample surface rapidly increases. Using this phenomenon, it is possible to manipulate the atom on the sample surface by monitoring the frequency shift $\Delta f$. If a discontinuous change in the frequency shift $\Delta f$ is detected, it suggests the presence of a certain level of interatomic force working between the probe 10 and an atom on the sample surface, so that this atom can be manipulated by moving the probe 10 in a direction parallel or perpendicular to the sample surface. Conventionally, it was difficult to accurately position the probe 10 at a desired atom position at room temperature because the relative position of the probe 10 and the sample changed with time due to the thermal drift or creep. The probe position control method according to the present invention can hold the probe 10 at a desired atom 50, so that the atom 50 can be manipulated without difficulty even at room temperature.

FIGS. 24(a)-24(e) show an example of the atom manipulation method (vertical manipulation) employing the present invention.

Figure 24:
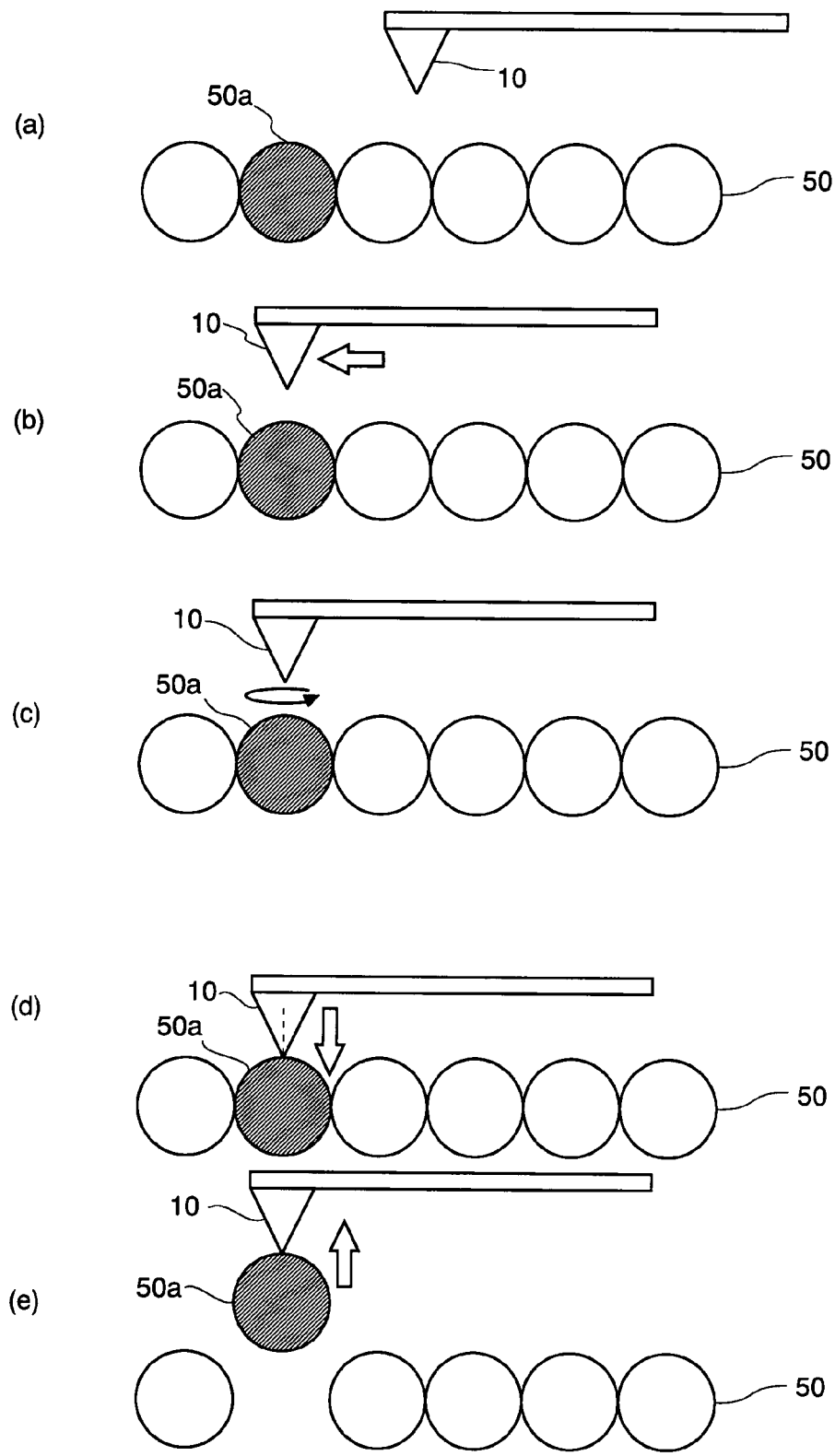
FIGS. 24(a)-24(e) show an example of the atom manipulation method (vertical manipulation) employing the present invention.

First, one of the atoms 50, 50, . . . on the sample surface is selected as the atom 50a to be manipulated (FIG. 24(a)). Then, the probe 10 is transferred to the position of the selected atom 50a (FIG. 24(b)). Next, the horizontal position of the probe 10 with respect to the atom 50a is fixed by the probe position control method according to the present invention (FIG. 24(c)). Then, the probe 10 is brought closer to the atom 50a until the interatomic force acting on the probe 10 reaches a predetermined level (FIG. 24(d)). During this process, if a discontinuous change in the frequency shift Δf is detected, it suggests the presence of a predetermined level of interatomic force acting on the probe 10. Therefore, the probe 10 is pulled away from the sample surface. Due to the interatomic force working between the probe 10 and the atom 50$a$, the atom 50$a$ is also pulled off the sample surface (FIG. 24($e$)). The atom 50$a$ may stick to the tip of the probe 10, as shown in FIG. 24($e$), or come off the probe 10.

Figure 25:
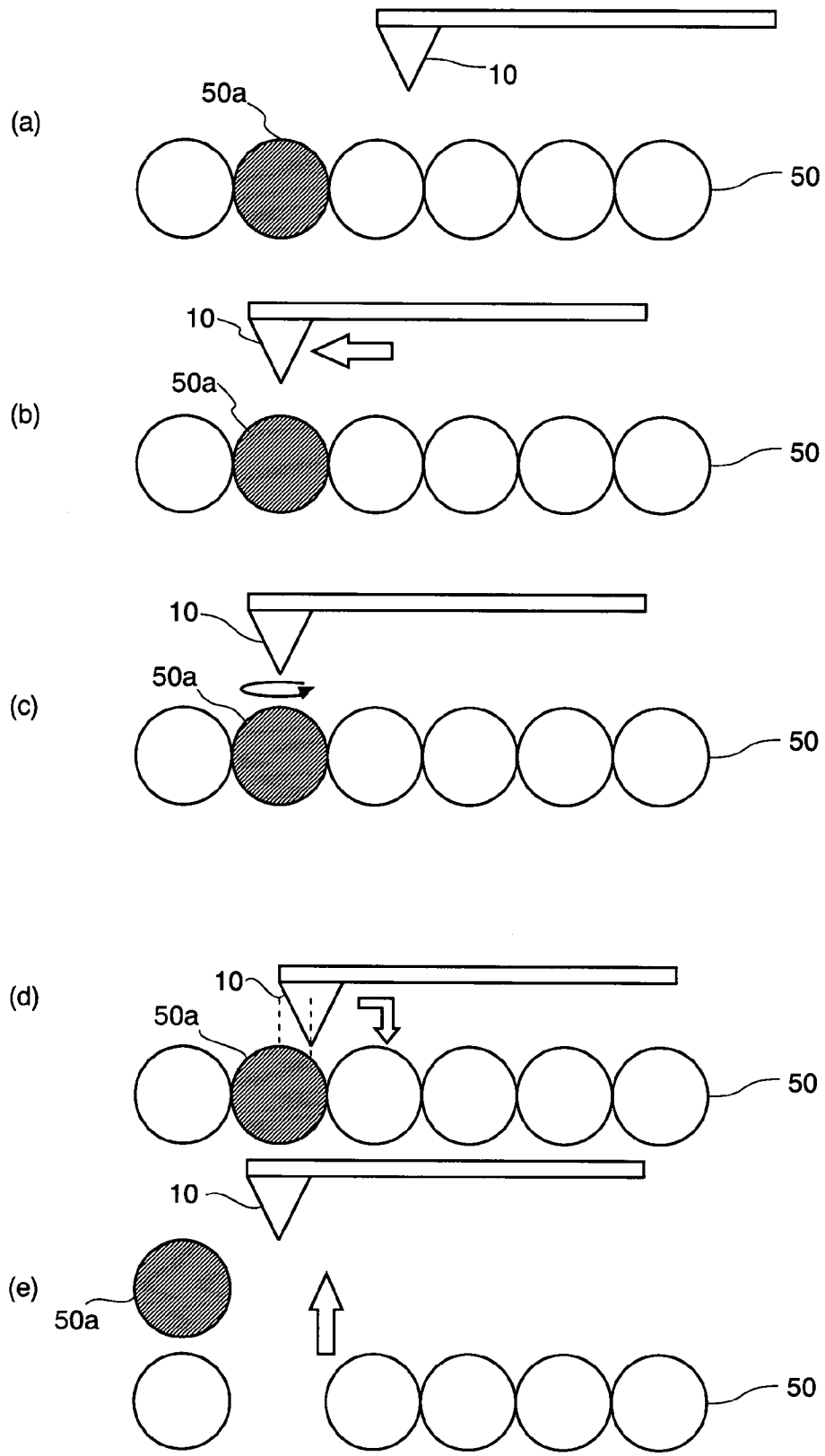
FIGS. 25(a)-25(e) show another example of the atom manipulation method (vertical manipulation) employing the present invention.

FIGS. 25($a$)-25($e$) show another example of the atom manipulation method (vertical manipulation) employing the present invention.

FIGS. 25($a$)-25($c$) are identical to FIGS. 24($a$)-24($c$) of the previous example. In the present example, the position fine-adjuster is used to move the probe 10 to a position slightly displaced from the atom fixation point of the expected line profile, and then the probe is brought closer to the atom 50$a$ until the interatomic force acting on the probe 10 reaches a predetermined level (FIG. 25($d$)). During this process, if a discontinuous change in the frequency shift Δf is detected, it suggests the presence of a predetermined level of interatomic force acting on the probe 10. Therefore, the probe 10 is pulled away from the sample surface. Due to the interatomic force working between the probe 10 and the atom 50$a$, the atom 50$a$ is also pulled off the sample surface (FIG. 25($e$)). Thus, it is possible to manipulate the atom 50$a$ while finely adjusting the relative position between the probe 10 and the atom 50$a$. The manipulated atom 50$a$ may come off the probe 10, as shown in FIG. 25($e$), or stick to the tip of the probe 10.

Figure 26:
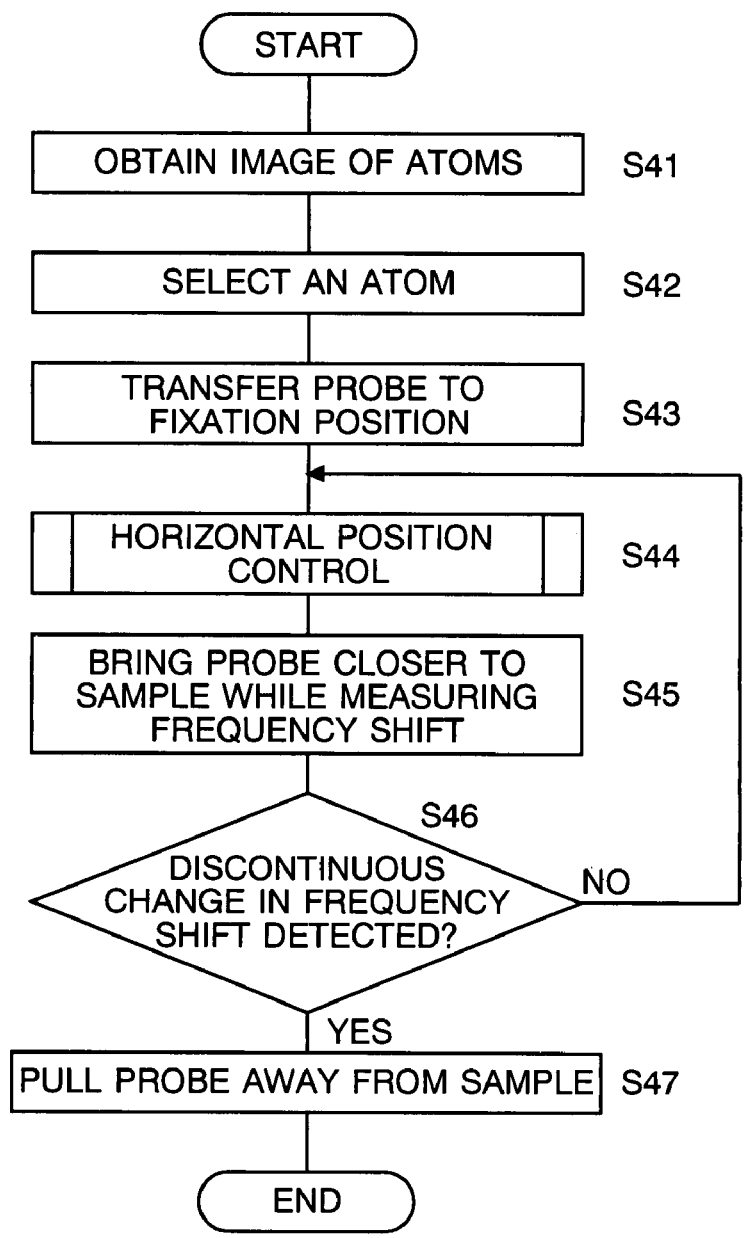
FIG. 26 is a flow chart of the atom manipulation method employing the present invention.

FIG. 26 is a flow chart of the atom manipulation method employing the present invention.

Using a scanning probe microscope, the sample surface is scanned to obtain an image of the atoms 50, 50, . . . on the sample surface (Step S41). On this image, one of the atoms 50, 50, . . . is selected as the atom 50$a$ to be manipulated (Step S42). Then, the probe 10 is transferred to the fixation point (Step S43) and the horizontal position control is performed (Step S44). Subsequently, the probe 10 is brought closer to the sample (atom 50$a$) while measuring the frequency shift Δf (Step S45). Then, whether or not a discontinuous change in the frequency shift Δf has been detected is checked (Step S46). If a discontinuous change has been detected (Step S46: YES), it is probable that the predetermined level of interatomic force is acting on the probe 10. Therefore, the probe 10 is pulled away from the sample surface (Step S47). If no discontinuous change has been detected (Step S46: NO), the process returns to Step S44 to perform the horizontal position control again and further bring the probe 10 closer to the sample (atom 50$a$). The horizontal position control in Step S44 is the same as shown in FIG. 17 or 18.

Figure 27:
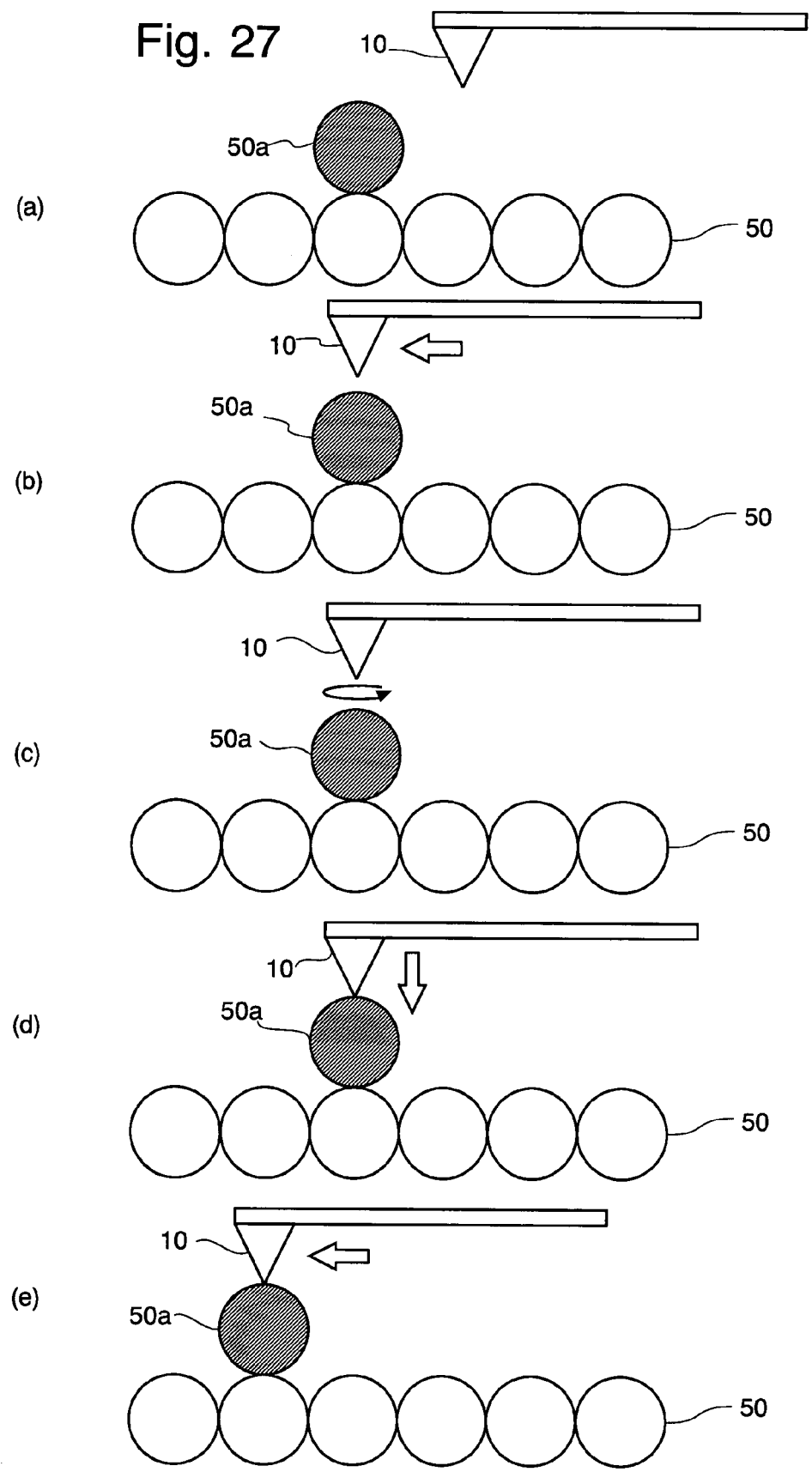
FIGS. 27(a)-27(e) show an example of the atom manipulation method (horizontal manipulation) employing the present invention.

In the previously described atom manipulation methods, the probe 10 is moved in the direction vertical to the sample surface to manipulate the atom 50$a$. It is also possible to move the probe 10 in the direction parallel to the sample surface to manipulate the atom 50$a$. FIGS. 27($a$)-27($e$) show an example of the atom manipulation method (horizontal manipulation) employing the present invention. Suppose that the objective atom 50$a$ is present on the other atoms 50, 50, . . . of the sample surface (FIG. 27($a$)). Then, first, the probe 10 is transferred to the position of the atom 50$a$ (FIG. 27($b$)). Next, the horizontal position of the probe 10 with respect to the atom 50$a$ is fixed by the probe position control method according to the present invention (FIG. 27($c$)). Then, the probe 10 is brought closer to the atom 50$a$ until the interatomic force acting on the probe 10 reaches a predetermined level (FIG. 27($d$)). After the interatomic force has reached the predetermined level, the probe 10 is horizontally transferred. Then, due to the interatomic force, the atom 50$a$ follows the movement of the probe 10 and is conveyed onto the neighboring atom on the sample surface (FIG. 27($e$)).

Figure 28:
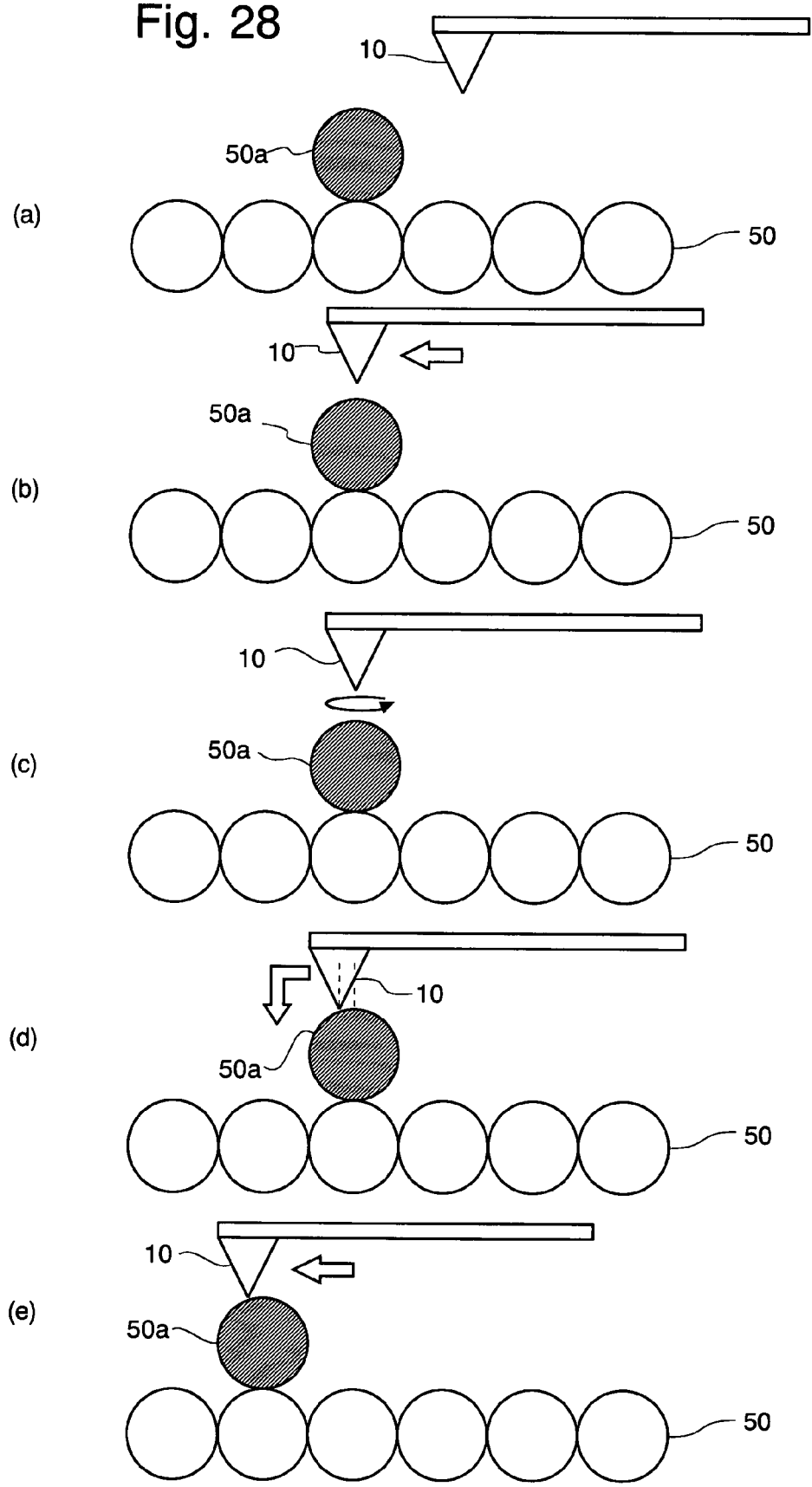
FIGS. 28(a)-28(e) show another example of the atom manipulation method (horizontal manipulation) employing the present invention.

The manipulation method shown in FIGS. 27($a$)-27($e$) can be modified as shown in FIG. 28($a$)-28($e$). The modified version differs from the previous one in that it uses the position fine-adjuster to horizontally move the probe 10 to a position slightly displaced from the atom fixation point of the expected line profile (FIG. 28($d$)). Due to the interatomic force working between the probe 10 and the atom 50$a$, the atom 50$a$ follows the movement of the probe 10 and is conveyed onto the neighboring atom on the sample surface (FIG. 28($e$)). Thus, the atom 50$a$ can be manipulated by finely adjusting the relative position of the probe 10 and the atom 50$a$.

Figure 29:
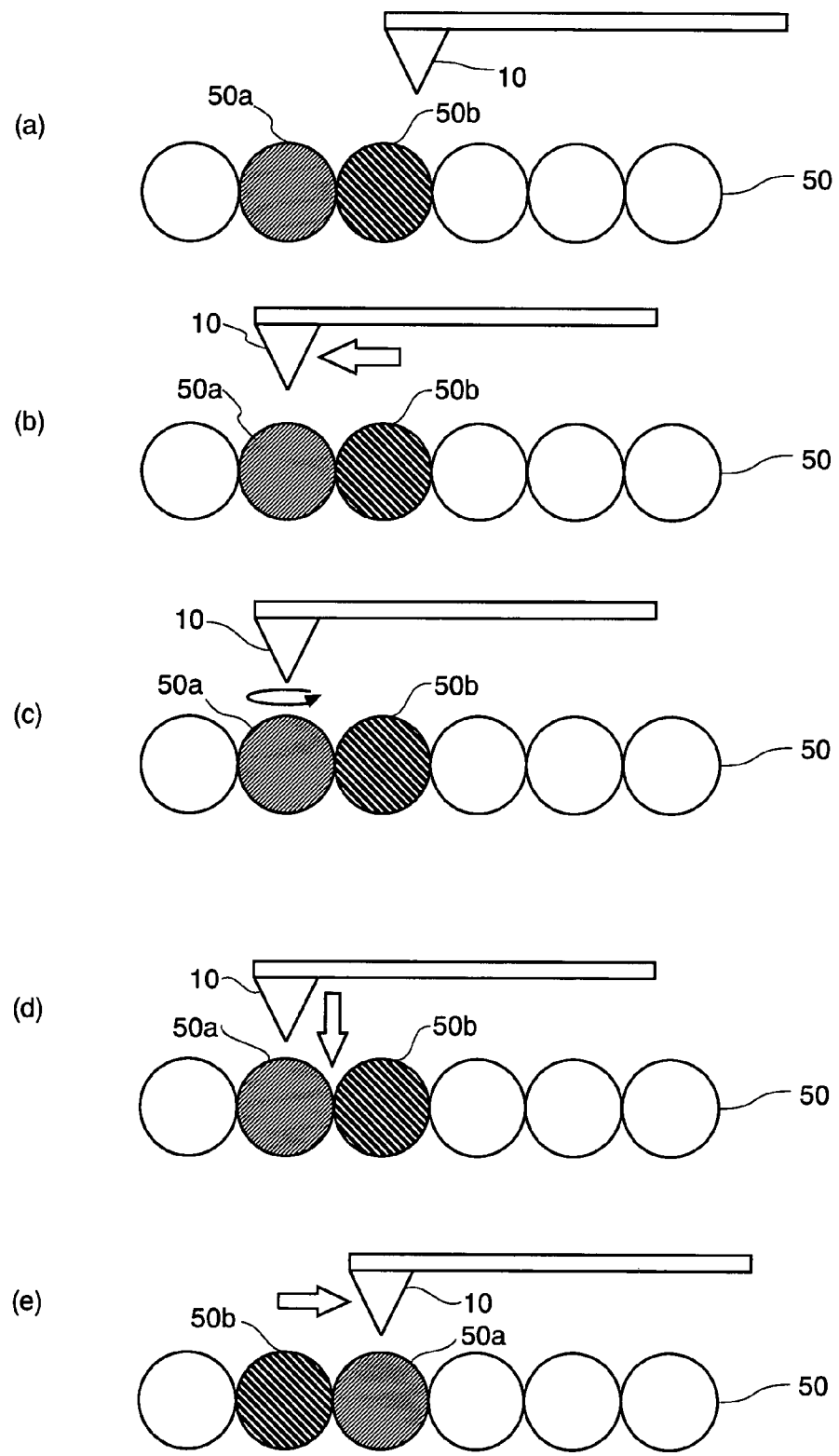
FIGS. 29(a)-29(e) show another example of the atom manipulation method (horizontal manipulation) employing the present invention.

FIGS. 29($a$)-29($e$) show another example of the atom manipulation method (horizontal manipulation) employing the present invention. Suppose that an atom 50$a$ (e.g. Sn atom) is located among the other atoms (e.g. Ge atom) 50, 50 . . . present on the sample surface (FIG. 29($a$)). Then, first, the probe 10 is transferred to the position of the atom 50$a$ (FIG. 29($b$)). Next, the horizontal position of the probe 10 with respect to the atom 50$a$ is fixed by the probe position control method according to the present invention (FIG. 29($c$)). Then, the probe 10 is brought closer to the atom 50$a$ until the interatomic force acting on the probe 10 reaches a predetermined level (FIG. 29($d$)). After the interatomic force has reached the predetermined level, the vertical position of the probe 10 is fixed, and the probe 10 is horizontally transferred to the position of the neighboring atom 50$b$ (FIG. 29($e$)). Then, due to the interatomic force working between the tip of the probe 10 and the atoms 50$a$ and 50$b$, the two atoms 50$a$ and 50$b$ are transposed.

Figure 30:
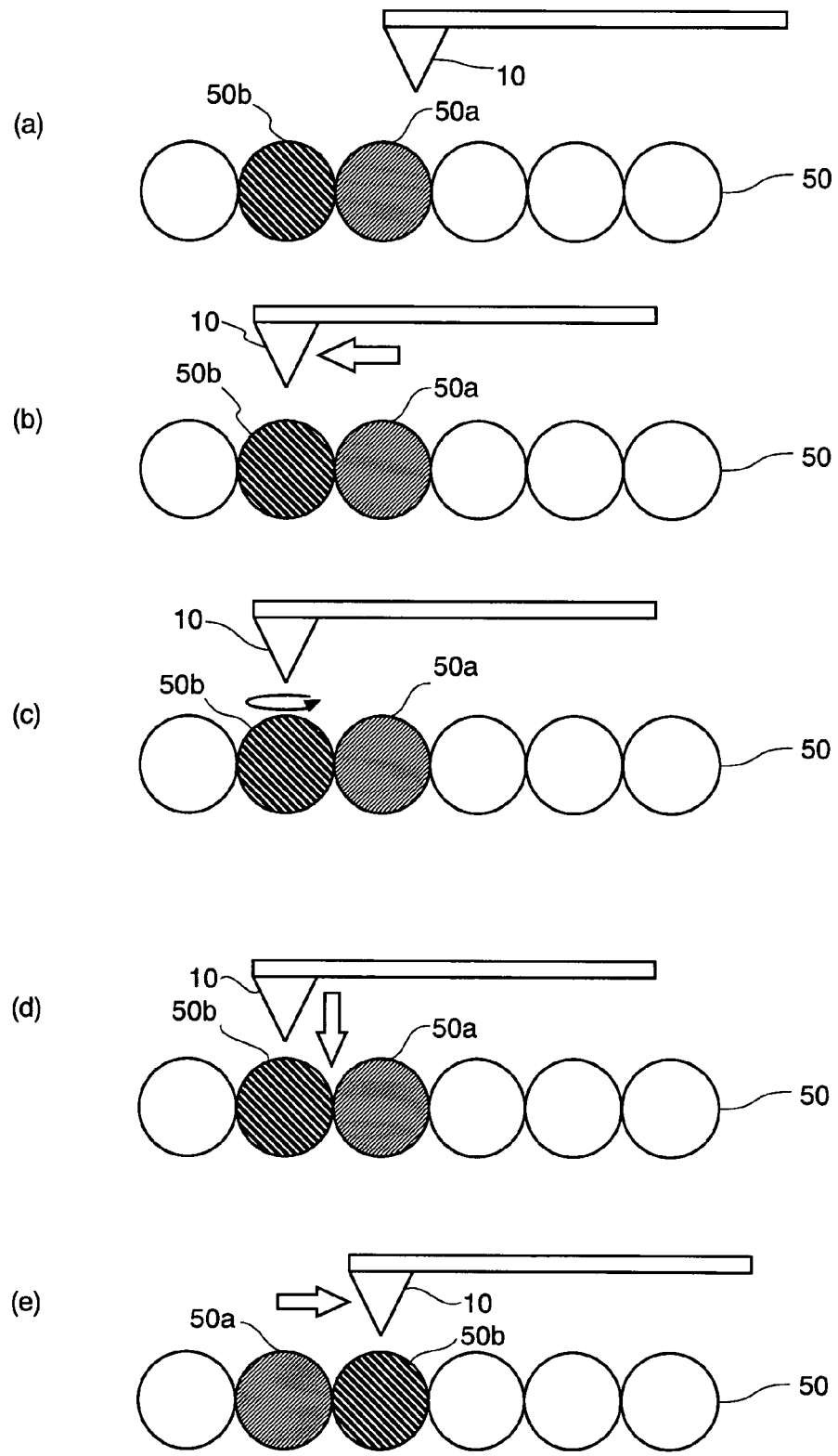
FIGS. 30(a)-30(e) show another example of the atom manipulation method (horizontal manipulation) employing the present invention.

In some cases, the transposition of the two atoms is caused more easily by moving the probe 10 from the first atom 50$a$ to the second one 50$b$ than by moving it in the opposite direction. FIGS. 30($a$)-30($e$) show such a case. The atom 50$a$ is located among the other atoms 50, 50 . . . present on the sample surface (FIG. 30($a$)). First, the probe 10 is transferred to the position of the atom 50$b$ next to the objective atom 50$a$ (FIG. 30($b$)). Next, the horizontal position of the probe 10 with respect to the atom 50$b$ is fixed by the probe position control method according to the present invention (FIG. 30($c$)). Then, the probe 10 is brought closer to the atom 50$b$ until the interatomic force acting on the probe 10 reaches a predetermined level (FIG. 30($d$)). After the interatomic force has reached the predetermined level, the vertical position of the probe 10 is fixed, and the probe 10 is horizontally transferred to the position of the objective atom 50$a$ (FIG. 30($e$)). Then, due to the interatomic force working between the tip of the probe 10 and the atoms 50$a$ and 50$b$, the two atoms 50$a$ and 50$b$ are transposed.

Figure 31:
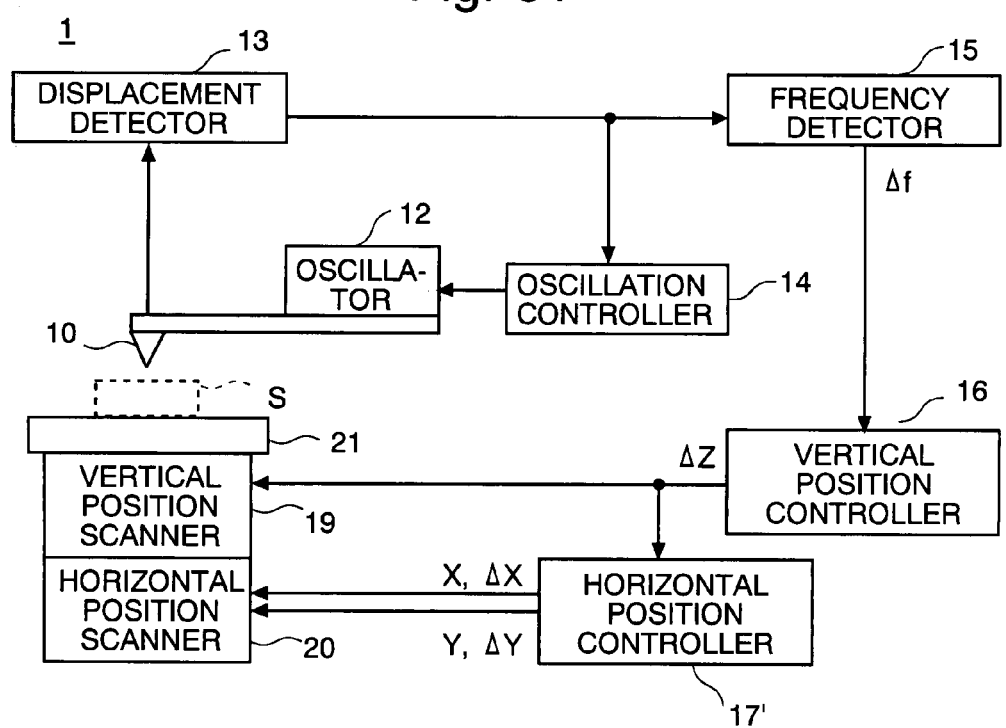
FIG. 31 is a block diagram showing another example of the construction of the atom position-fixing system employing the present invention.

In the previous embodiments, the frequency detector 15 detects the change in the resonance frequency (i.e. the frequency shift Δf) and sends the horizontal position adjuster 17 a signal reflecting the detected change. The horizontal position adjuster 17 conducts a feedback control of the horizontal position so that the frequencies $f_1$ and $f_2$ (or $f_0$) contained in the signal indicative of the frequency shift $\Delta f$ are maintained at zero (see FIG. 5). This mechanism can be modified as shown in FIG. 31. In the modified version, the horizontal position controller 17' conducts the horizontal position control on the basis of an output signal $\Delta Z$ of the vertical position controller 16. The horizontal position controller 17' differs from the previous horizontal position controller 17 with respect to the relationship between the bandwidth of the vertical position controller 16 and the frequencies $f_1$ and $f_2$. Provided that the bandwidth of the vertical position controller 16 is denoted by $f_{FB}$, the construction shown in FIG. 5 is advantageous if both $f_1$ and $f_2$ are higher than $f_{FB}$, and the construction shown in FIG. 31 is advantageous if both $f_1$ and $f_2$ are lower than $f_{FB}$. However, it should be noted that the feedback control function of the vertical position controller 16 is implemented using several filters whose bandwidth cannot be exactly determined.

Figure 32:
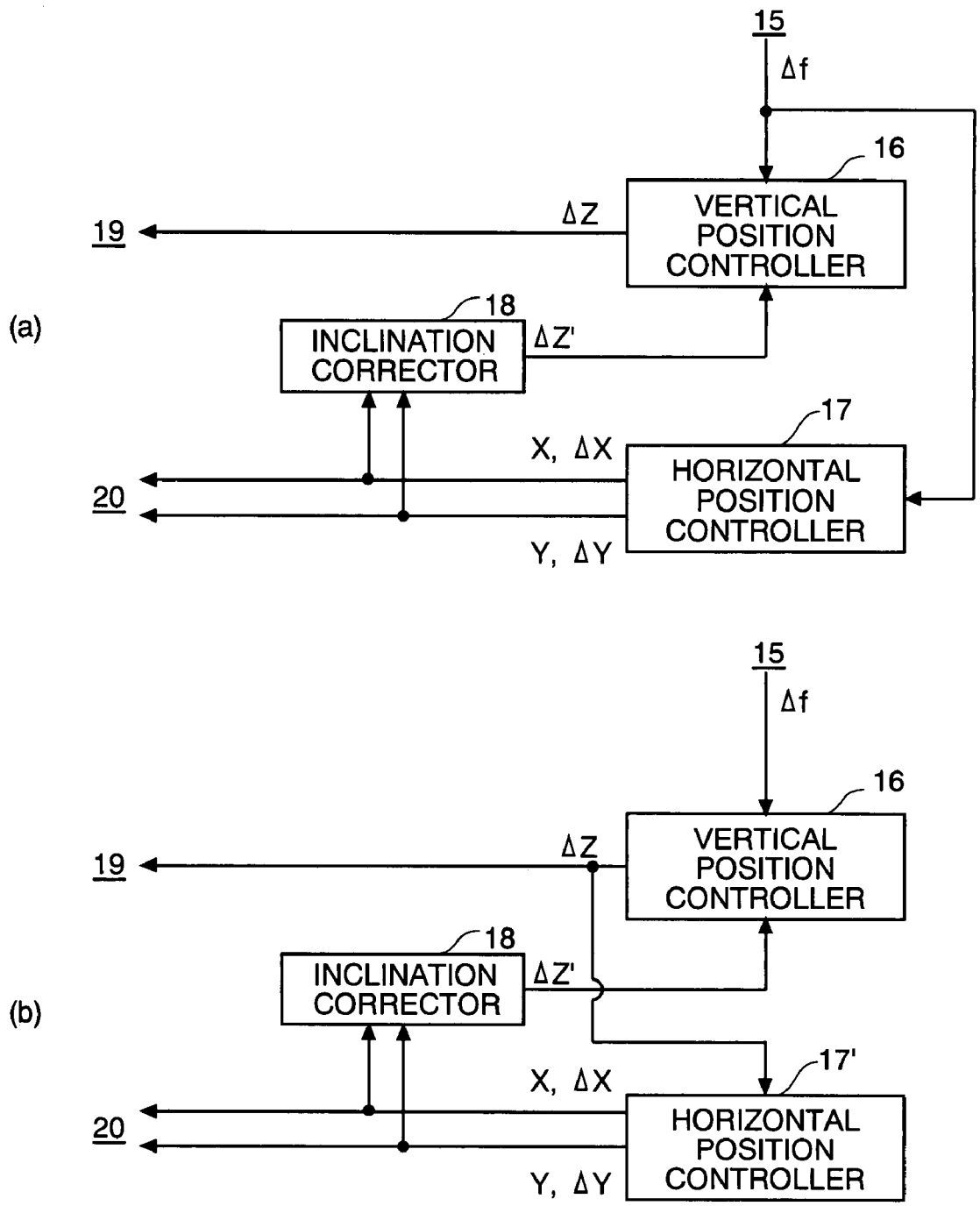
FIG. 32 is a block diagram showing another example of the construction of the atom position-fixing system employing the present invention.

In actual measurements, the sample may be inclined, causing the vertical distance to change when the probe moves in the X-direction, Y-direction or both directions. Taking this into account, the construction shown in FIG. 5 may further include an inclination corrector 18 for correcting the inclination of the sample by calculating a vertical distance correction value $\Delta Z'$ from the output values of the horizontal position controller 17 (X, $\Delta X$, Y, $\Delta Y$) and adding $\Delta Z'$ to the output value $\Delta Z$ of the vertical position controller 16 (FIG. 32(*a*)). The construction shown in FIG. 31 may also include the inclination corrector 18. In this case, the inclination corrector 18 calculates the vertical distance correction value $\Delta Z'$ from the output values of the horizontal position controller 17' (X, $\Delta X$, Y, $\Delta Y$) and feeds $\Delta Z'$ back to the vertical position controller 16, which in turn regulates the vertical distance $\Delta Z$ of the probe so that the inclination of the sample is compensated for (FIG. 32(*b*)). For example, the vertical position controller 16 adds its output signal $\Delta Z$ and the signal $\Delta Z'$ received from the inclination corrector 18 to produce a corrected signal, which is fed to the vertical position scanner 19.

In the previous embodiments, the three-dimensional change in the relative position of the probe 10 and the sample (atom 50) was produced by "moving the probe 10." Alternatively, the change may be produced by moving the sample (atom 50) or both the probe 10 and the sample (atom 50). The present invention can be applied to these alternative methods without any problem.

What is claimed is:

1. A probe position control system for performing a control of a relative position of a probe and a sample while measuring an interaction between an atom on a sample surface and a tip of the probe to obtain an atomic-level image of the sample surface or perform a certain manipulation on the atom on the sample surface, comprising:
 a) a measuring device for measuring the aforementioned interaction in a direction perpendicular to the sample surface;
 b) an oscillator for relatively oscillating the probe and the sample in two directions parallel to the sample surface at frequencies of $f_1$ and $f_2$, respectively;
 c) a tracker for measuring the aforementioned interaction, before the control of the relative position of the probe and the sample, while relatively moving the probe and the sample, for detecting a point where the frequencies $f_1$ and $f_2$ disappear from a measured value of the interaction, and for creating a relative movement of the probe and the sample so that the measurement value thereby detected is maintained; and
 d) a speed detector for determining a speed of the aforementioned relative movement created by the tracker; and
 e) a corrector for correcting the control of the relative position of the probe and the sample using the detected speed.

2. The probe position control system according to claim 1, wherein the frequencies $f_1$ and $f_2$ are equal to each other.

3. The probe position control system according to claim 2, wherein the aforementioned two directions are mutually perpendicular, and the frequencies $f_1$ and $f_2$ have a phase difference of 90 degrees.

4. The probe position control system according to claim 2, wherein the speed detector detects a speed in a direction parallel to the sample surface.

5. The probe position control system according to claim 4, wherein the speed detector also detects a speed in a direction perpendicular to the sample surface.

6. The probe position control system according to claim 1, wherein the aforementioned two directions are mutually perpendicular, and the frequencies $f_1$ and $f_2$ have a phase difference of 90 degrees.

7. The probe position control system according to claim 6, wherein the speed detector detects a speed in a direction parallel to the sample surface.

8. The probe position control system according to claim 7, wherein the speed detector also detects a speed in a direction perpendicular to the sample surface.

9. The probe position control system according to claim 1, wherein the speed detector detects a speed in a direction parallel to the sample surface.

10. The probe position control system according to claim 9, wherein the speed detector also detects a speed in a direction perpendicular to the sample surface.

11. A probe position control method for performing a control of a relative position of a probe and a sample while measuring an interaction between an atom on a sample surface and a tip of the probe to obtain an atomic-level image of the sample surface or perform a certain manipulation on the atom on the sample surface, comprising steps of:
 a) relatively moving the probe and the sample, before the control of the relative position of the probe and the sample, while relatively oscillating the probe and the sample in two directions parallel to the sample surface at frequencies of $f_1$ and $f_2$, respectively, and detecting a point where the frequencies $f_1$ and $f_2$ disappear from a measured value of the interaction in the direction perpendicular to the sample surface;
 b) creating a relative movement of the probe and the sample so that the measurement value thereby detected is maintained, and detecting a speed of the controlled relative movement; and
 c) correcting, after that, the control of the relative position of the probe and the sample using the detected speed.

12. The probe position control method according to claim 11, wherein the frequencies $f_1$ and $f_2$ are equal to each other.

13. The probe position control method according to claim 12, wherein the aforementioned two directions are mutually perpendicular, and the frequencies $f_1$ and $f_2$ have a phase difference of 90 degrees.

14. The probe position control method according to claim 12 wherein a speed in a direction parallel to the sample surface is detected in step c).

15. The probe position control method according to claim 14, wherein a speed in a direction perpendicular to the sample surface is also detected in step c).

16. The probe position control method according to claim 11, wherein the aforementioned two directions are mutually perpendicular, and the frequencies $f_1$ and $f_2$ have a phase difference of 90 degrees.

17. The probe position control method according to claim 16 wherein a speed in a direction parallel to the sample surface is detected in step c).

18. The probe position control method according to claim 17, wherein a speed in a direction perpendicular to the sample surface is also detected in step c).

19. The probe position control method according to claim 11, wherein a speed in a direction parallel to the sample surface is detected in step c).

20. The probe position control method according to claim 19, wherein a speed in a direction perpendicular to the sample surface is also detected in step c).

* * * * *